US011845885B2

(12) United States Patent
Schmid et al.

(10) Patent No.: US 11,845,885 B2
(45) Date of Patent: Dec. 19, 2023

(54) DUAL STAGE STRUCTURAL BONDING ADHESIVE

(71) Applicant: 3M INNOVATIVE PROPERTIES COMPANY, St. Paul, MN (US)

(72) Inventors: Matthew J. Schmid, Roberts, WI (US); Cyrus A. Anderson, Bellingham, WA (US); Kathleen S. Shafer, Woodbury, MN (US); Xiao Gao, Woodbury, MN (US); James M. Nelson, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 1091 days.

(21) Appl. No.: 16/062,295

(22) PCT Filed: Dec. 28, 2016

(86) PCT No.: PCT/US2016/068783
§ 371 (c)(1),
(2) Date: Jun. 14, 2018

(87) PCT Pub. No.: WO2017/117163
PCT Pub. Date: Jul. 6, 2017

(65) Prior Publication Data
US 2018/0371298 A1 Dec. 27, 2018

Related U.S. Application Data

(60) Provisional application No. 62/273,093, filed on Dec. 30, 2015.

(51) Int. Cl.
*C09J 163/00* (2006.01)
*C09J 4/00* (2006.01)
(Continued)

(52) U.S. Cl.
CPC ............. *C09J 163/00* (2013.01); *C08L 33/08* (2013.01); *C09J 4/00* (2013.01); *C09J 5/00* (2013.01);
(Continued)

(58) Field of Classification Search
CPC ..... C09J 163/00; C09J 4/00; C09J 5/00; C09J 7/38; C09J 2205/102; C09J 2205/31;
(Continued)

(56) References Cited

U.S. PATENT DOCUMENTS 3,619,150 A  11/1971  Royden et al.
3,922,464 A  11/1975  Silver et al.
(Continued)

FOREIGN PATENT DOCUMENTS

DE  3516661  11/1985
EP  0335629 A2 * 10/1989  ........... G03F 7/0955
(Continued)

OTHER PUBLICATIONS

Zeiss, "Fundamentals of Mercury Arc Lamps", Carl Zeiss Microscopy Online Campus, Florida State Univ., Nov. 16, 2008 (Year: 2008).*

(Continued)

*Primary Examiner* — Christopher W Raimund
(74) *Attorney, Agent, or Firm* — Carlos M. Téllez Rodriguez; 3M Innovative Properties Company

(57) ABSTRACT

Provided are methods and associated compositions directed to a structural bonding adhesive. The structural bonding adhesive is made by mixing a curable composition comprising a mixture of a first curable resin and a second curable resin to provide an uncured adhesive. The uncured adhesive is irradiated by a first actinic light source to polymerize the first curable resin without polymerizing the second curable resin to provide a partially cured adhesive. The partially
(Continued)

cured adhesive is a pressure-sensitive adhesive that displays cold flow creep recovery under ambient conditions and is capable of being fully cured by irradiating the partially cured adhesive using a second actinic light source that is different from the first actinic light source to polymerize the second curable resin.

20 Claims, 7 Drawing Sheets

(51) Int. Cl.
| | |
|---|---|
| C09J 5/00 | (2006.01) |
| C08L 33/08 | (2006.01) |
| C09J 7/38 | (2018.01) |
| C08K 5/03 | (2006.01) |
| C08K 5/06 | (2006.01) |
| C08K 5/5397 | (2006.01) |
| C08L 33/10 | (2006.01) |
| C08L 71/00 | (2006.01) |

(52) U.S. Cl.
CPC .................................. *C09J 7/38* (2018.01); *C08K 5/03* (2013.01); *C08K 5/06* (2013.01); *C08K 5/5397* (2013.01); *C08L 33/10* (2013.01); *C08L 71/00* (2013.01); *C09J 2301/408* (2020.08); *C09J 2301/416* (2020.08)

(58) Field of Classification Search
CPC .......... C08L 33/08; C08L 33/10; C08L 71/00; C08K 5/03; C08K 5/06; C08K 5/5397
See application file for complete search history.

(56) References Cited

U.S. PATENT DOCUMENTS

| | | | |
|---|---|---|---|
| 4,642,126 | A | 2/1987 | Zador et al. |
| 4,645,711 | A | 2/1987 | Winslow et al. |
| 4,652,274 | A | 3/1987 | Boettcher et al. |
| 4,717,605 | A | 1/1988 | Urban et al. |
| 4,737,593 | A | 4/1988 | Ellrich et al. |
| 4,988,554 | A | 1/1991 | Peterson et al. |
| 5,037,453 | A | 8/1991 | Narayanan et al. |
| 5,108,463 | A | 4/1992 | Buchanan |
| 5,116,676 | A | 5/1992 | Winslow |
| 5,342,419 | A | 8/1994 | Hibbard |
| 5,628,952 | A | 5/1997 | Holmes et al. |
| 5,648,425 | A | 7/1997 | Everaerts et al. |
| 5,663,241 | A | 9/1997 | Takamatsu et al. |
| 5,700,302 | A | 12/1997 | Stoetzel et al. |
| 5,702,811 | A | 12/1997 | Ho et al. |
| 5,704,952 | A | 1/1998 | Law et al. |
| 5,721,289 | A | 2/1998 | Karim et al. |
| 5,804,610 | A | 9/1998 | Hamer et al. |
| 5,833,724 | A | 11/1998 | Wei et al. |
| 5,914,299 | A | 6/1999 | Harmer et al. |
| 6,057,382 | A | 5/2000 | Karim et al. |
| 6,083,290 | A | 7/2000 | Ikeda et al. |
| 6,153,302 | A | 11/2000 | Karim et al. |
| 6,183,677 | B1 | 2/2001 | Usui et al. |
| 6,187,836 | B1 | 2/2001 | Oxman et al. |
| 6,254,954 | B1 | 7/2001 | Bennett et al. |
| 6,354,929 | B1 | 3/2002 | Adefris et al. |
| 6,359,027 | B1 | 3/2002 | Dahlke et al. |
| 6,372,323 | B1 | 4/2002 | Kobe et al. |
| 6,682,574 | B2 | 1/2004 | Carter et al. |
| 6,773,474 | B2 | 8/2004 | Koehnle et al. |
| 6,835,220 | B2 | 12/2004 | Swei et al. |
| 7,329,175 | B2 | 2/2008 | Woo et al. |
| 7,713,604 | B2 | 5/2010 | Yang et al. |
| 8,506,752 | B2 | 8/2013 | Vandal et al. |
| 2002/0182955 | A1 | 12/2002 | Weglewski et al. |
| 2003/0114078 | A1 | 6/2003 | Mann |
| 2008/0233348 | A1* | 9/2008 | Ishiwatari .................. C09J 7/38 428/134 |
| 2009/0155596 | A1 | 6/2009 | Kropp et al. |
| 2010/0022170 | A1 | 1/2010 | Starling et al. |
| 2013/0219800 | A1 | 8/2013 | Guiselin |
| 2014/0113131 | A1 | 4/2014 | Yamamoto et al. |
| 2014/0120344 | A1 | 5/2014 | Yamamoto et al. |
| 2014/0370265 | A1* | 12/2014 | Lee ........................... B32B 7/12 428/220 |
| 2015/0030839 | A1 | 1/2015 | Satrijo et al. |

FOREIGN PATENT DOCUMENTS

| | | |
|---|---|---|
| EP | 2679332 | 1/2014 |
| EP | 2722376 | 4/2014 |
| EP | 3012288 | 4/2016 |
| EP | 2868692 | 10/2017 |
| GB | 2492304 | 12/2012 |
| JP | 55127482 | 10/1980 |
| JP | 2000008025 | 1/2000 |
| WO | WO 94/29399 | 12/1994 |
| WO | WO 96/21704 | 7/1996 |
| WO | WO 2009/059900 | 5/2009 |
| WO | WO 2014/172139 | 10/2014 |
| WO | WO 2014/172332 | 10/2014 |
| WO | WO 2016/035170 | 3/2016 |
| WO | WO 2016/073227 | 5/2016 |
| WO | WO 2016/085791 | 6/2016 |
| WO | WO 2016/195970 | 12/2016 |
| WO | WO 2016/196561 | 12/2016 |
| WO | WO 2017/116941 | 7/2017 |
| WO | WO 2017/117356 | 7/2017 |
| WO | WO 2017/117364 | 7/2017 |

OTHER PUBLICATIONS

Decker, "Kinetic study and new applications of UV radiation curing," Macromolecular Rapid Communications, 2002, vol. 23, pp. 1067-1093.

Mark, "Encyclopedia of Polymer Science and Technology," Wiley-interscience publication, 1986, vol. 6, pp. 322-380.

International Search report for PCT International Application No. PCT/US2016/068783 dated Apr. 21, 2017, 4 pages.

\* cited by examiner

DUAL STAGE STRUCTURAL BONDING ADHESIVE

CROSS REFERENCE TO RELATED APPLICATIONS

This application is a national stage filing under 35 U.S.C. 371 of PCT/US2016/068783, filed Dec. 28, 2016, which claims the benefit of U.S. Provisional Application No. 62/273,093, filed Dec. 30, 2015, the disclosures of which are incorporated by reference in their entireties herein.

FIELD OF THE INVENTION

Provided are methods and compositions capable of adhering hardware to a surface of a substrate. These methods and compositions can, for example, be used to adhere hardware to vehicular glass surfaces such as automotive windshields.

BACKGROUND

Structural bonding adhesives are adhesive products capable of providing tough and durable bonds to a wide variety of surfaces. While mechanical fastening methods can damage substrates, induce localized stress, require re-finishing steps, and can leave aesthetically objectionable protrusions, structural bonding adhesives do none of these. When used to fasten metal substrates to each other, these adhesive products also avoid galvanic corrosion issues that can arise when dissimilar metals contact each other.

A growing area for structural bonding adhesives is in bonding articles to glass surfaces, such as glass windshields for cars and other motor vehicles. It is common, for example, that a small mirror button or bracket is bonded to the inner surface of a windshield. Yet, with the emergence of rain sensors, multifunction cameras, collision avoidance sensors, and lane departure cameras in modern cars, much larger areas of the windshield have become reserved to accommodate these multiple devices. Original equipment manufacturers have found it advantageous to consolidate these devices on a large bracket bonded to the upper central portion of the windshield.

The high profile of these brackets has significantly impacted the manufacturing process for automotive windshields. Laminated glass generally uses a thin polymer support layer, such as polyvinyl butyral, sandwiched between layers of tempered glass. Brackets with lower profiles can simply be attached to one of the tempered glass layers using a thermally-cured structural bonding adhesive, and the layers of the assembly co-laminated in an autoclave to form the finished windshield. The much larger brackets of modern cars hinder stacking of the windshields in an autoclave, as described in U.S. Pat. No. 8,506,752 (Vandal et al.), which has led to the development of bonding solutions outside of the autoclave. Light activated bonding solutions are compatible with outside-of-autoclave cure, but these compositions have technical shortcomings, as described in U.S. Patent Publication No. 2002/0182955 (Weglewski et al.).

SUMMARY

It can be challenging to provide a light-activated structural bonding adhesive that possesses acceptable cold flow and handling properties. Conventional light-activated compositions tend to slowly flow (or "creep") over time, which can induce deformation under roll winding tensions, produce caliper variations, and complicate die-cutting of the finished product. To overcome problems with creep, prior approaches have explored chilling the adhesive material prior to die-cutting and during storage. Other approaches involve embedding a scrim or other scaffold in the adhesive to enhance its dimensional stability.

Notwithstanding these approaches, a need remains for a structural bonding adhesive that resists cold flow creep, thereby facilitating die-cutting and storage, and can be applied as a pressure-sensitive adhesive tape and subsequently light-cured to obtain a robust structural bond. Such an adhesive is described herein. The provided adhesives derive from precursor materials with two different photoinitiators directed to two respective curable resin systems. One photoinitiator can be activated independently of the other to provide a "B-stage" pressure-sensitive adhesive that displays acceptable wet out and can be easily die cut and handled at ambient conditions without significant creep.

In a first aspect, a method of making a structural bonding adhesive is provided. The method comprises: disposing a curable composition comprising a mixture of a first curable resin and a second curable resin onto a release liner to provide an uncured adhesive; and irradiating the uncured adhesive using a first actinic light source to polymerize the first curable resin without polymerizing the second curable resin thereby providing a partially cured adhesive, wherein the partially cured adhesive is a pressure-sensitive adhesive that displays cold flow creep recovery under ambient conditions and can be fully cured by irradiating the partially cured adhesive using a second actinic light source to polymerize the second curable resin.

In a second aspect, a method of bonding hardware to a substrate is provided, comprising: disposing a partially cured adhesive on a bonding surface of either the hardware or the substrate, the partially cured adhesive comprising the reaction product of a curable composition irradiated by a first actinic light source, the curable composition comprised of: a) a free radical-polymerizable resin; b) a cationically-polymerizable resin; c) a free radical photoinitiator sensitive to radiation from the first actinic light source; and d) a photoacid generator sensitive to radiation from a second actinic light source different from the first actinic light source; either before or after disposing the partially cured adhesive on the bonding surface, irradiating the partially cured adhesive using the second actinic light source; placing the hardware so as to be bonded to the substrate by the partially cured adhesive; and allowing the partially cured adhesive to fully cure.

In a third aspect, a curable composition for making a structural bonding adhesive is provided, the curable composition comprising: a free radical-polymerizable resin; a cationically-polymerizable resin; a free radical photoinitiator sensitive to radiation from the first actinic light source; and a photoacid generator insensitive to radiation from the first actinic light source but sensitive to radiation from a second actinic light source, wherein the free radical-polymerizable resin and the cationically-polymerizable resin are capable of covalently bonding with each other when irradiated by the second actinic light source.

In a fourth aspect, a curable composition for making a structural bonding adhesive is provided, the curable composition comprising: a) in the range of 0.1-70 parts of one or more free radical-polymerizable resins; b) in the range of 10-80 parts one or more cationically-polymerizable resins; c) in the range of 0-20 parts of one or more polyols; d) in the range of 0-50 parts of one or more polymeric resins at least partially miscible with a)-c), wherein the sum of a)-d) is 100 parts per weight; e) in the range of 0.02-5 parts of a free radical photoinitiator; and f) in the range of 0.05-5 parts of a photoacid generator.

Figure 1:
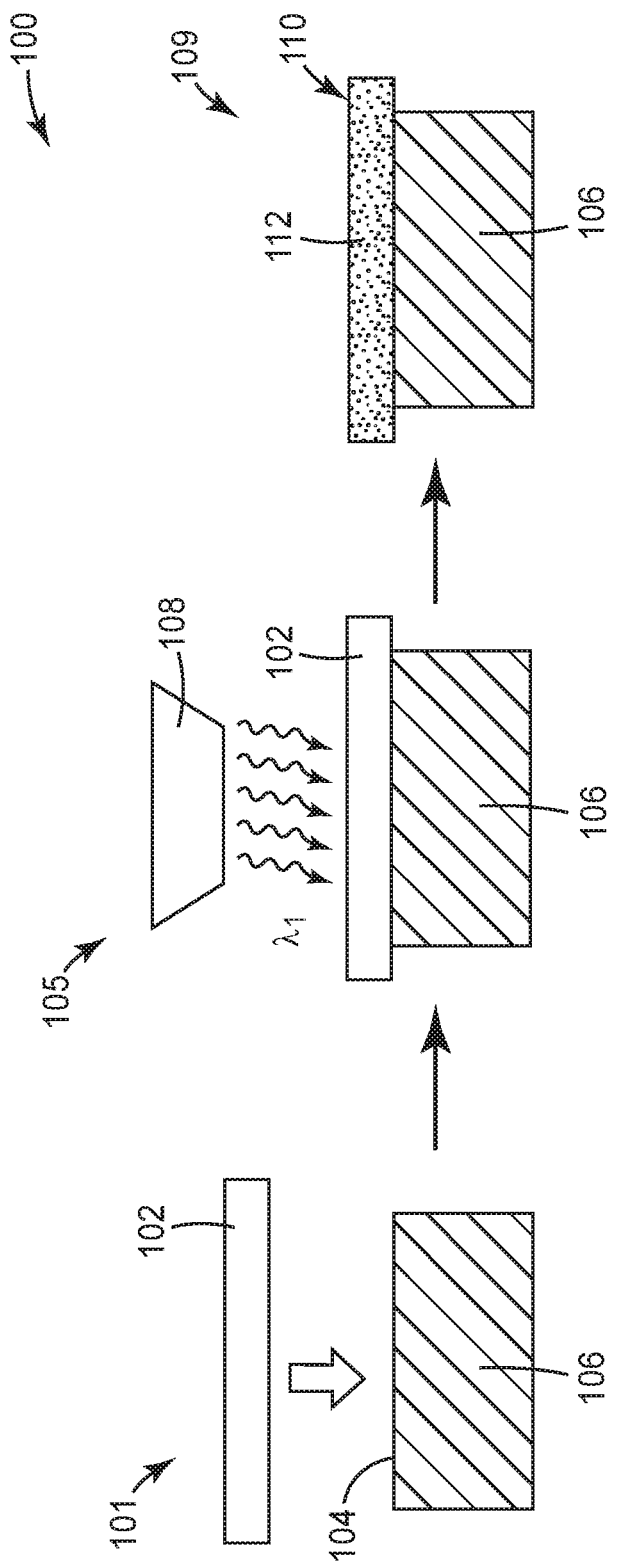
FIG. 1 is a schematic showing a method of making a structural bonding adhesive according to a first exemplary embodiment.

The figures may not be drawn to scale. Repeated use of reference characters in the specification and drawings is intended to represent the same or analogous features or elements of the disclosure. It should be understood that numerous other modifications and embodiments can be devised by those skilled in the art which fall within the scope and spirit of the principles of the disclosure.

Definitions

As used herein:
"ambient temperature" means at a temperature of 25° C.;
"ambient conditions" means at a temperature of 25° C. and pressure of 1 atm (101 kilopascals);
"cure" refers to the process of reacting monomers and/or oligomers into a covalently bonded network;
"diol" means a compound having a hydroxyl functionality of exactly two;
"fully cured" means a given material is sufficiently crosslinked to perform its ultimate function in a given application;
"partially cured" means a given material is sufficiently crosslinked to perform an interim function, but not its ultimate function, in a given application;
"polyfunctional" means a compound having two or more chemically-reactive moieties;
"polyol" means a compound having a hydroxyl functionality of two or more; and
"semi-crystalline" means having at least some crystalline domains.

DETAILED DESCRIPTION

Described herein are useful methods, articles and compositions for structural bonding applications. Exemplary applications include the bonding of hardware to glass, such as vehicular glass. Vehicular glass, in exemplary embodiments, includes laminated glass windshields in cars, motorcycles, and boats, side and rear view mirrors, skylights, and side-facing and rear-facing windows.

In exemplary automotive applications, the hardware represents a bracket having an external surface adapted for bonding to the curved, interior surface of a glass windshield. Such brackets may include large format brackets capable of accommodating multiple accessories such as rain sensors, multifunction cameras, collision avoidance sensors, lane departure cameras, or even one or more peripheral brackets. Additional brackets may include those adapted for bonding tempered glass found in side- and rear-windows of a vehicle.

It is to be understood, however, that the methods, articles and compositions are not limited to vehicular applications (as shown in the figures) but can extend to any of a variety of commercial industrial applications in which a load-bearing structural bond is desired. Such applications may require, for example, that the structural adhesive retain bond strength over a range of hot and cold temperatures, at various levels of humidity, or when exposed to significant levels of ultraviolet light. Certain applications may also require chemical resistance, such as resistance to hydrocarbons such as oil, gasoline, diesel fluid, etc. or cleaning solutions that contain weak acids and bases. Other applications may have mechanical challenges, such as impact and vibration requirements. Each of these may be considered in determining the suitability of a given structural bonding adhesive for a given application.

Making and Using Structural Adhesives

FIGS. 1-5 illustrate exemplary methods in which the provided adhesives can be made and used in a structural bonding application. The steps shown merely exemplify the provided embodiments and are not intended to be exhaustive. It is further understood that additional steps may be inserted prior to, after, or between the illustrated steps according to the knowledge and skill of a professional practicing in this technical field.

An exemplary process for making a structural bonding adhesive is shown in FIG. 1 and broadly referred to herein by the numeral 100. In step 101 of the process 100, a layer of uncured adhesive 102 is disposed onto a bonding surface 104 of hardware 106 to be bonded. As noted above, the hardware 106 is generically represented here and could be, for example, a bracket that accommodates one or more accessories and is shaped for bonding to a windshield. In this figure, the bonding surface 104 extends over an entire major surface of the hardware 106 but this need not be the case.

The uncured adhesive 102 is preferably a liquid or viscoelastic material at ambient conditions. Subject to the properties of uncured adhesive 102, any known method can be used to apply this composition to the hardware 106. Exemplary methods include blade coating, roll coating, dip coating, spray coating, spin coating, or any of a number of known flexographic or screen printing methods.

Particulars of the composition of the uncured adhesive 102 are omitted here but shall be addressed in a later section, entitled "ADHESIVE COMPOSITIONS."

Referring to step 105, the coated uncured adhesive 102 is then partially cured whereby some of the monomers, oligomers, and/or polymers in the uncured adhesive 102 are covalently crosslinked. This reaction is activated by irradiating the uncured adhesive 102 using a first actinic light source 108. The first actinic light source 108 produces light of a suitable wavelength or range of wavelengths to initiate a curing reaction in a first curable resin in the uncured adhesive 102 such that the uncured adhesive 102 becomes partially cured.

Useful actinic light sources include ultraviolet ("UV") light and visible light sources. For this application, preferred light sources have a controlled spectral output where the distribution of wavelength is fairly narrow (or "substantially monochromatic") and centered about a characteristic wavelength $\lambda_1$, such as a wavelength corresponding to a peak intensity. This is not critical, however, and other distributions of wavelengths, including polymodal distributions, may be feasible.

One useful class of actinic light sources uses light emitting diodes ("LED"). LED-based UV sources are advantageous because they are capable of generating UV light over a much narrower wavelength range compared with other UV light sources such as black lights and mercury lamps. Such LED sources are commercially available, for example, the AC Series 365 nm or 395 nm LED Curing Systems available from Excelitas Technologies (Waltham, Mass.).

The output of the first actinic light source 108 is capable of partially curing (or crosslinking) the uncured adhesive 102 by chemically activating a suitable photoinitiator present in the first curable resin in the uncured adhesive 102.

In an exemplary embodiment, the first actinic light source 108 produces a spectral output with a peak intensity at a wavelength $\lambda_1$ of at least 380 nm, at least 383 nm, at least 386 nm, at least 390 nm, or at least 393 nm. In this embodiment, the peak intensity can be at a wavelength $\lambda_1$ of up to 420 nm, up to 419 nm, up to 418 nm, up to 417 nm, or up to 416 nm. The excitation dose used to activate the photoinitiator can be at least 200 mJ/cm$^2$, at least 250 mJ/cm$^2$, at least 300 mJ/cm$^2$, at least 350 mJ/cm$^2$, or at least 400 mJ/cm$^2$. The excitation dose can be up to 6400 mJ/cm$^2$, up to 5600 mJ/cm$^2$, 4800 mJ/cm$^2$, up to 4000 mJ/cm$^2$, or up to 3200 mJ/cm$^2$.

In the third step 109 of the process 100, the irradiation is discontinued and the first curable resin of the uncured adhesive 102 allowed to cure, thus providing a partially bonded assembly 110 comprised of the hardware 106 and partially cured adhesive 112 (distinguished from the uncured adhesive 102 in FIG. 1 by a somewhat darker shading).

Advantageously, the partially cured adhesive 112 is rendered dimensionally stable by virtue of its physically crosslinked structure. Because it is dimensionally stable, the partially cured adhesive 112 does not significantly change in length, width, or thickness over time under the force of gravity. It is preferable for the dimensions of the partially cured adhesive 112 to remain stable even when subjected to usual processing, handling, shipment, and storage procedures typically encountered during and after its manufacture.

The partially cured adhesive 112 may, in some cases, be subjected to sustained levels of stress that can induce creep at ambient temperature. Sources of such stress can include, for example, roll winding tensions or stacking weight. Irradiating the uncured resin with the first actinic light source was found to significantly reduce the extent to which cold flow creep occurs under these conditions.

It was also discovered that under these conditions, the partially cured adhesive 112 can display a significant degree of cold flow creep recovery once the stress is removed. In some embodiments, the partially cured adhesive 112 displays a cold flow creep recovery of at least 40 percent, at least 50 percent, at least 60 percent, or at least 70 percent, as measured according to the General Creep and Creep-Recovery Test and Creep and Creep-Recovery Test 1 disclosed in the Examples.

Preferably, the partially cured adhesive 112 has a shelf life of at least 10 days, at least 30 days, at least 60 days, at least 120 days, at least 180 days, or at least 360 days at ambient conditions. As used herein, shelf life is defined as the time period beyond the partial curing of the adhesive over which the second curable resin remains essentially uncured while maintained under dark conditions.

Figure 2:
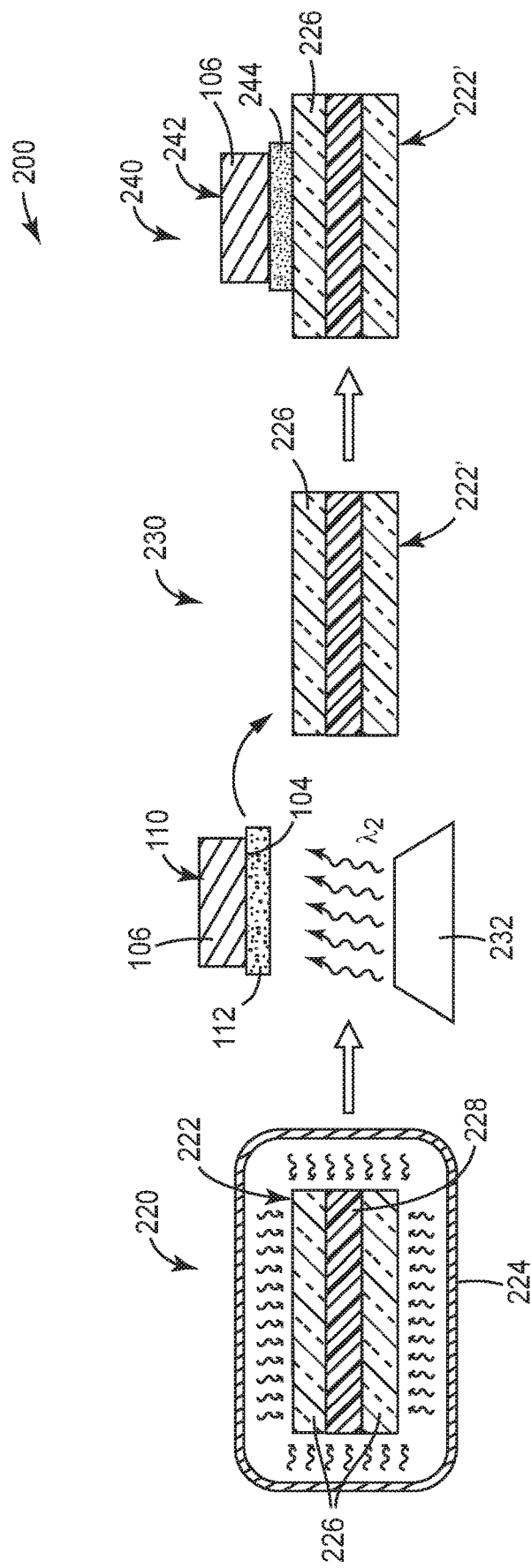
FIG. 2 is a schematic showing an exemplary method of adhering hardware to glass using the structural bonding adhesive of FIG. 1.

FIG. 2 is directed to an exemplary process 200 for bonding the partially bonded assembly 110 to an automotive windshield, represented in this figure as laminated glass 222'. The first step, designated by numeral 220, represents the autoclaving of a layered construction to obtain an automotive windshield. The automotive windshield is made from laminated glass, which is a type of safety glass that remains in one piece when shattered.

In step 220, a layered construction 222 is received in an autoclave 224, which operates to laminate the layers of the layered construction 222 to each other by subjecting its layers to highly pressurized hot air or steam. As shown in FIG. 2, the layered construction includes a pair of glass layers 226, 226 disposed on opposing major surfaces of a polymeric interlayer 228. The polymeric interlayer 228 is typically made from a tough, flexible polymer such as polyvinyl butyral ("PVB") or ethylene-vinyl acetate ("EVA").

Optionally, the glass layers 226, 226 are made from tempered glass. Tempered glass is a glass that is processed by controlled thermal or chemical treatments to increase its strength compared with normal glass. Tempering operates by placing the outward-facing surfaces of the glass into compression and the interior of the glass into tension.

The combination of high temperature and pressure provided by the autoclave 224 permanently laminates the layers 226, 228, 226 together to afford the laminated glass 222'. Step 230 shows the process of affixing the partially cured adhesive assembly 110 onto the laminated glass 222'. This is achieved by a two-step process.

First, the partially cured adhesive 112 is irradiated using a second actinic light source 232 to initiate a second curing reaction. This reaction involves polymerizing a second curable resin in the partially cured adhesive 112 whereby the partially cured adhesive 112 becomes fully cured over time. The second actinic light source 232 emits light over a distribution of wavelengths that is different from that of the first actinic light source 108. Here, the second actinic light source 232 has a characteristic wavelength $\lambda_2$ different from the characteristic wavelength $\lambda_1$ of the first actinic light source 108. In preferred embodiments, the wavelength $\lambda_2$ is shorter than the wavelength $\lambda_1$.

The wavelength $\lambda_2$ depends in part on the characteristics of a second photoinitiator in the second curable resin that is used to activate a second curing reaction. In a preferred embodiment, the second photoinitiator is a photoacid generator. Photoacid generators are molecules that generate acids when irradiated by light. These molecules are often used in cationic polymerizations, and typically include strong Bronsted acids, carbocations, and onium salts such as triaryloxonium salts. These types of photoinitiators will be described in further detail in a later section.

The wavelength $\lambda_2$ at which the photoacid generator is triggered can be non-specific since it is used for the final curing step. In exemplary embodiments, the wavelength $\lambda_2$ can be at least 200 nm, at least 250 nm, at least 300 nm, at least 330 nm, or at least 356 nm. The wavelength $\lambda_2$ can be up to 380 nm, up to 377 nm, or up to 374 nm.

As shown in FIG. 2, light from the second actinic light source 232 is directed to the partially cured adhesive 112 towards the underlying bonding surface 104 of the hardware 106. If desired, the actinic light can be transmitted to the partially cured adhesive 112 through the hardware 106 itself if the hardware 106 is made from a material translucent to the actinic light.

The second actinic light source 232 provides light that initiates a second, independently activated, curing reaction in the second curable resin of the partially cured adhesive 112. Such activation occurs independently when the event or events used to induce the first curing reaction do not activate the second curing reaction. As will be shown in the Examples, this can be demonstrated using, for example, Fourier Transform Infrared ("FTIR") spectroscopy, which can detect decreases in the amounts of unreacted functional groups that take part in the second curing reaction. If any decreases measured are statistically negligible when the uncured adhesive 102 is irradiated with the first curing light 108, the activation of these reactions can be considered as independent of each other.

In advantageous embodiments, the second curing reaction not only crosslinks the second curable resin, but induces covalent bonding between functional groups of the first curable resin and the second curable resin. In other words, the free radical-polymerizable resin and the cationically-polymerizable resin are capable of covalently bonding with each other when irradiated by the second actinic light source. In this manner, even when cured sequentially, the covalently crosslinked networks created from the first and second curable resins are able to form a unitary crosslinked network.

Next, as shown in the second part of step 230, the partially cured assembly 110 (that is, the hardware 106 and partially cured adhesive 112) is mounted onto the autoclaved laminated glass 222'.

Finally, and as shown in final step 240, time is allowed for the partially cured adhesive 112 to fully cure and thus form bonded assembly 242. In the bonded assembly 242, the fully cured adhesive 244 mutually contacts the hardware 106 and one of the glass layers 226, providing a finished structural bond.

The amount of time required to form a functional structural bond following irradiation with the second actinic light source 232 can be at least 1 minute, at least 30 minutes, at least 1 hour, at least 2 hours, at least 4 hours, at least 8 hours, or at least 12 hours. In some cases, the periods of time specified above may be achieved by heating the adhesive composition.

Until it is fully cured, the partially-cured adhesive 112 preferably has the properties of a pressure-sensitive adhesive ("PSA"). It is preferable that the PSA has sufficient tack and dimensional stability to obviate use of a clamp or other mechanism to secure the hardware 106 to the glass layer 226 while the second curing reaction proceeds.

Since the second curing reaction occurs after the first curing reaction, the characteristics of second actinic light source 232 need not be as restricted as those of the first actinic light source 108. The second actinic light source 232 could be based on an LED source, as described earlier. Alternatively, the second actinic light source 232 could be a UV black light, mercury lamp, or other broad spectrum light source.

A UV black light is a relatively low light intensity source that provides generally 10 mW/cm$^2$ or less (as measured in accordance with procedures approved by the United States National Institute of Standards and Technology as, for example, with a UVIMAP UM 365 L-S radiometer manufactured by Electronic Instrumentation & Technology, Inc., Sterling, Va.) over a wavelength range of 280 nm to 400 nm.

A mercury lamp is a higher intensity broad-spectrum UV source capable of providing intensities generally greater than 10 mW/cm$^2$, and preferably between 15 and 6000 mW/cm$^2$. For example, an intensity of 600 mW/cm$^2$ and an exposure time of about 1 second may be used successfully. Intensities can range from 0.1 mW/cm$^2$ to 6000 mW/cm$^2$ and preferably from 0.5 mW/cm$^2$ to 3000 mW/cm$^2$.

To avoid inadvertently triggering both the first and second curing reactions simultaneously, the first actinic light source 108 emits over wavelengths that are not significantly absorbed by the second photoinitiator. Where generally monochromatic light sources are used, the first and second actinic light sources could operate at different wavelengths; for example, they could have respective peak intensities at wavelengths separated by at least 10 nm, at least 15 nm, at least 20 nm, at least 25 nm, or at least 35 nm. The first and second actinic light sources could have respective peak intensities at wavelengths separated by up to 100 nm, up to 80 nm, up to 60 nm, up to 50 nm, or up to 45 nm.

It can also be advantageous for the second curable resin to preferentially absorb radiation emitted by the second actinic light source 232 relative to radiation emitted by the first actinic light source 108.

The irradiation of the adhesive layer 112 in step 230 is generally sufficient to achieve a functional cure of the adhesive layer 112 without further intervention. It can be advantageous in some cases, however, to reduce the time required to reach a functional cure by applying heat. Heat can be applied, for example, through a post-cure bake, in which the mounted partially bonded assembly 242 is placed in a heated oven for a pre-determined period of time.

The post-cure bake for an onium salt-type photoacid generator can last for at least 1 minute, at least 2 minutes, at least 3 minutes, or at least 5 minutes. On the upper end, the post-cure bake may be sustained up to 35 minutes, up to 25 minutes, or up to 15 minutes. The temperature of the post-cure bake can be, for example, at least 35° C., at least 70° C., or at least 90° C. The temperature can be up to 180° C., up to 150° C., or up to 120° C.

Figure 3:
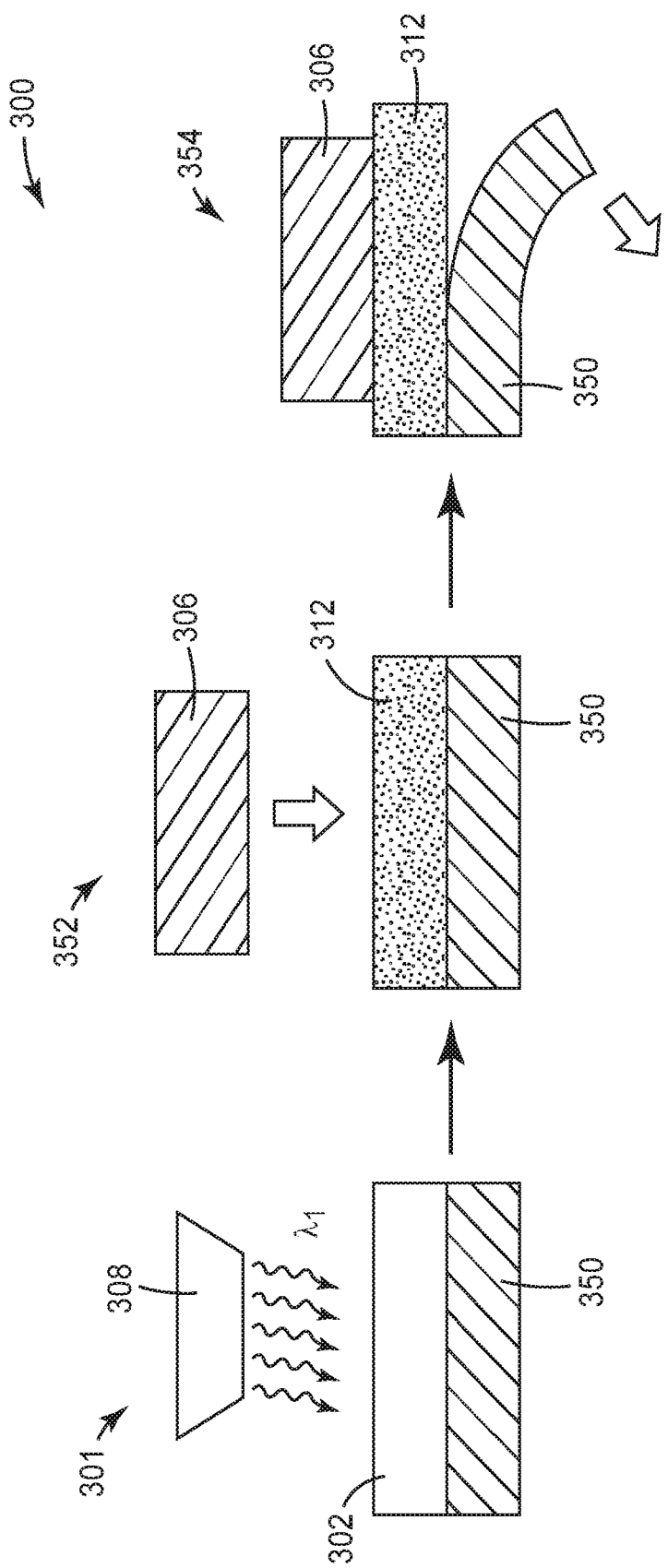
FIG. 3 is a schematic showing a method of making a structural bonding adhesive according to a second exemplary embodiment.

FIG. 3 shows another process 300 to prepare a structural bonding adhesive which enables the partially cured adhesive to undergo further conversion steps. In a first step 301, an uncured resin 302 is coated onto a release liner 350 and a first actinic light source 308 used to partially cure the uncured resin 302 like in step 105 of FIG. 1. The release liner 350 itself is not particularly restricted and could be, for example, any of a number of silicone-coated polyester release liners known in the art.

In the second step 352 of the process 300 shown in FIG. 3, the hardware 306 is placed in contact with the now partially cured adhesive 312. As one benefit of this configuration, the hardware 306 and release liner 350 cover up and prevent contamination of the adhesive layer. The release liner 350 can facilitate handling of the adhesive-coated article (e.g., by providing support thereto as well as covering the adhesive) and provide a surface for labeling purposes if so desired.

After forming the partially cured adhesive 312, but prior to the step 352, one or more conversion steps can take place to modify the size or shape of the adhesive. While not explicitly shown in FIG. 3, the partially cured adhesive 312 can optionally be die cut according to a pre-determined pattern that matches a respective bonding surface of the hardware 306. A significant advantage of the provided structural bonding adhesives is the possibility of performing die cut operations on the partially cured adhesive at ambient temperature without need for chilling down the material beforehand. Further benefits include easier slitting, removal of excess material from cut surfaces, and improved dimensional stability after placement on hardware for shipping and storage.

The die-cut adhesive generally takes the form of a discontinuous adhesive layer. It is often desirable for the discontinuous adhesive layer to be shaped such that it does not extend beyond the peripheral edges of the mating bonding surfaces. If desired, two or more discontinuous die cut adhesive layers may be disposed side-to-side on a bonding surface.

The final step 354 of FIG. 3 can be carried out shortly before bonding the hardware 306 to a given substrate. In this step, the release liner 350 is peeled away from the partially cured adhesive 312 to expose the adhesive. From here, the hardware/adhesive assembly could be affixed to a suitable adherend using a method such as described in steps 230, 240 of process 200.

Figure 4:
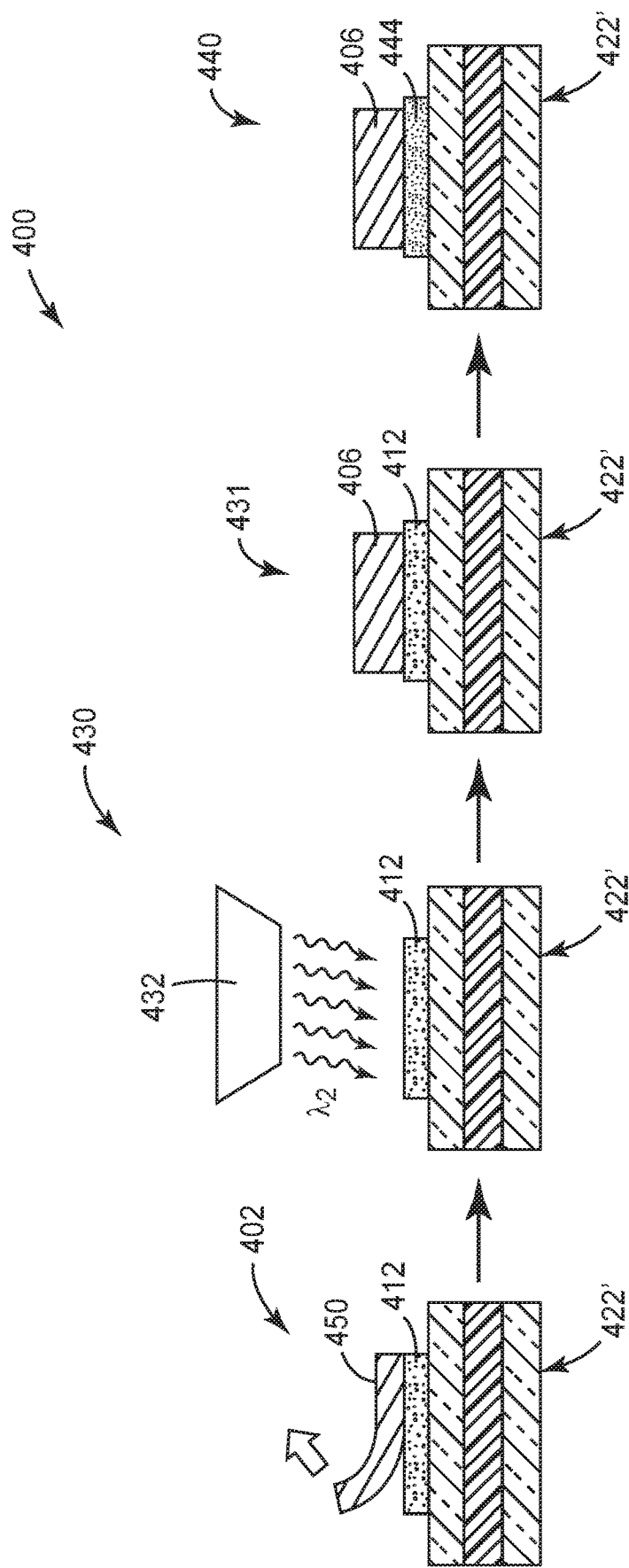
FIGS. 4 and 5 are schematics showing exemplary methods of adhering hardware to glass using the structural bonding adhesive of FIG. 1, FIG. 3, or variant thereof.

FIG. 4 illustrates a process 400 for bonding to laminated glass using a partially cured adhesive as shown previously except with certain steps reversed. In step 402, a lined partially cured adhesive 412 (made, for example, by step 301 in process 300 of FIG. 3) is bonded to the laminated glass 422' and then release liner 450 is peeled away to expose the adhesive. In the next step 430, a second actinic light source 432 is used to irradiate the partially cured adhesive 412 and initiate the full curing of the partially cured adhesive 412. Before a full cure state is reached, hardware 406 placed so as to be bonded to the laminated glass 422' by the partially cured adhesive 412 (step 431). Finally, in step 440, time is allowed to form the fully cured adhesive 444, at which time acceptable bond strength has been achieved.

Figure 5:
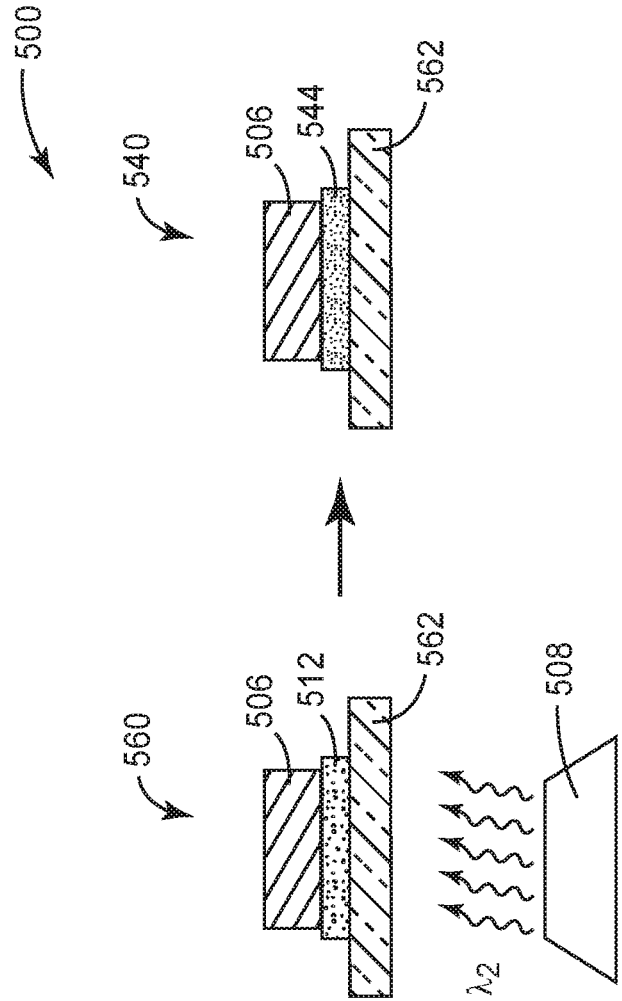

FIG. 5 shows yet another process 500 for bonding hardware to a substrate that is transparent or translucent to light from a second actinic light source 508. In step 560 of this method, the hardware 506 is placed in a position to be bonded to a substrate 562 by an interposing layer of partially cured adhesive 512 and is then irradiated through the substrate 562 using the second actinic light source 508. Attributes of the partially cured adhesive 512 and the second actinic light source 508 as depicted in FIG. 5 are analogous to those already described and will not be repeated. Finally, in step 540, the partially cured adhesive 512 is then allowed to fully cure over time to provide fully cured adhesive 544.

The process 500 could be useful in situations where open time is an issue in the bonding process. Where the steps are conducted manually, for example, an operator may require additional time to align and join the bonding surfaces to each other prior to initiating the curing of the adhesive. Conversely, where the kinetics of the second curing reaction are particularly facile, adhesive wet out (and potentially, interfacial bond strength) could be rendered more consistent when the bonding surfaces are joined prior to irradiation.

Figure 6:
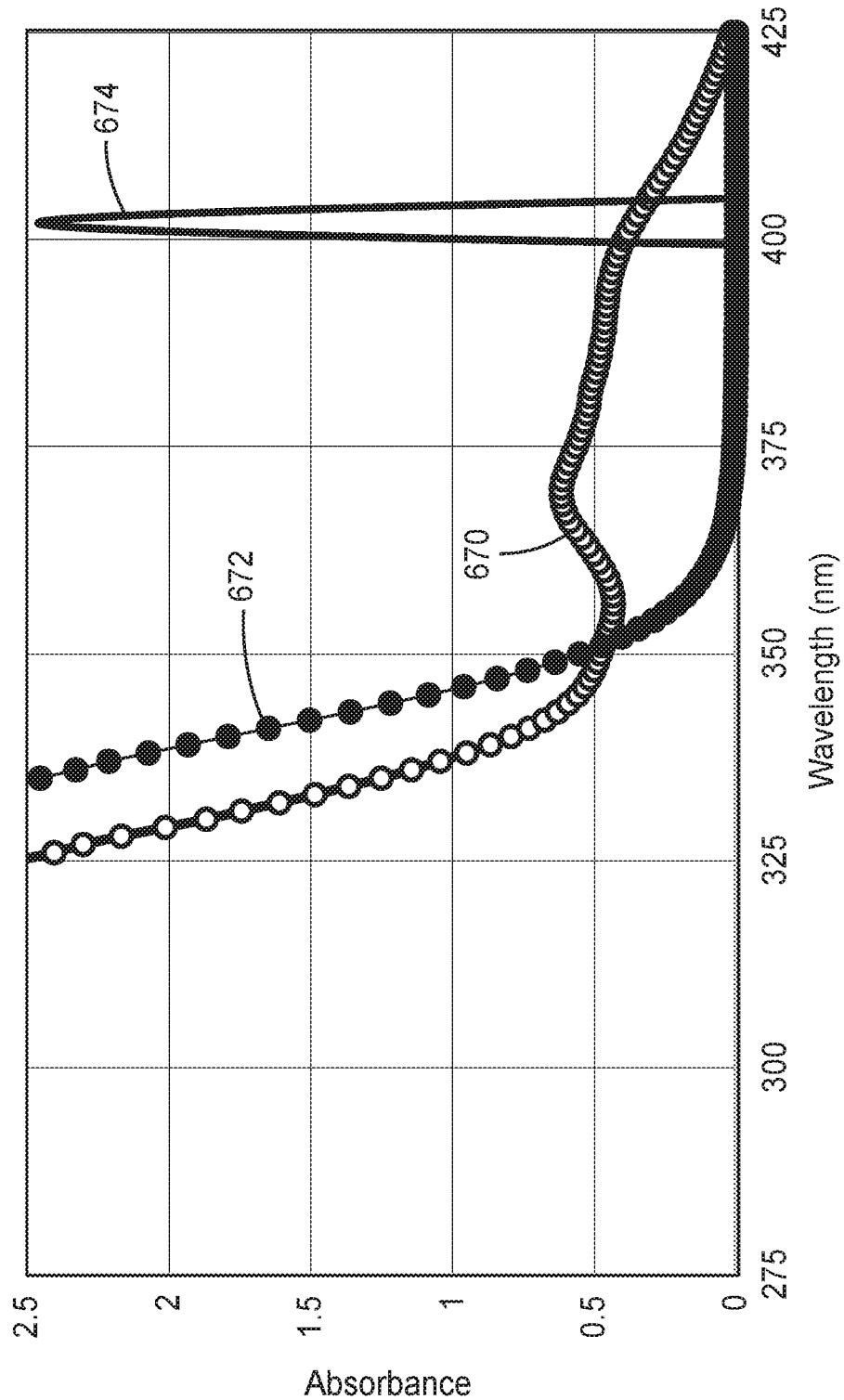
FIG. 6 is a light absorption curve for two exemplary photoinitiators of the provided structural bonding adhesives compared with the spectral output of an actinic light source.
Figure 7:
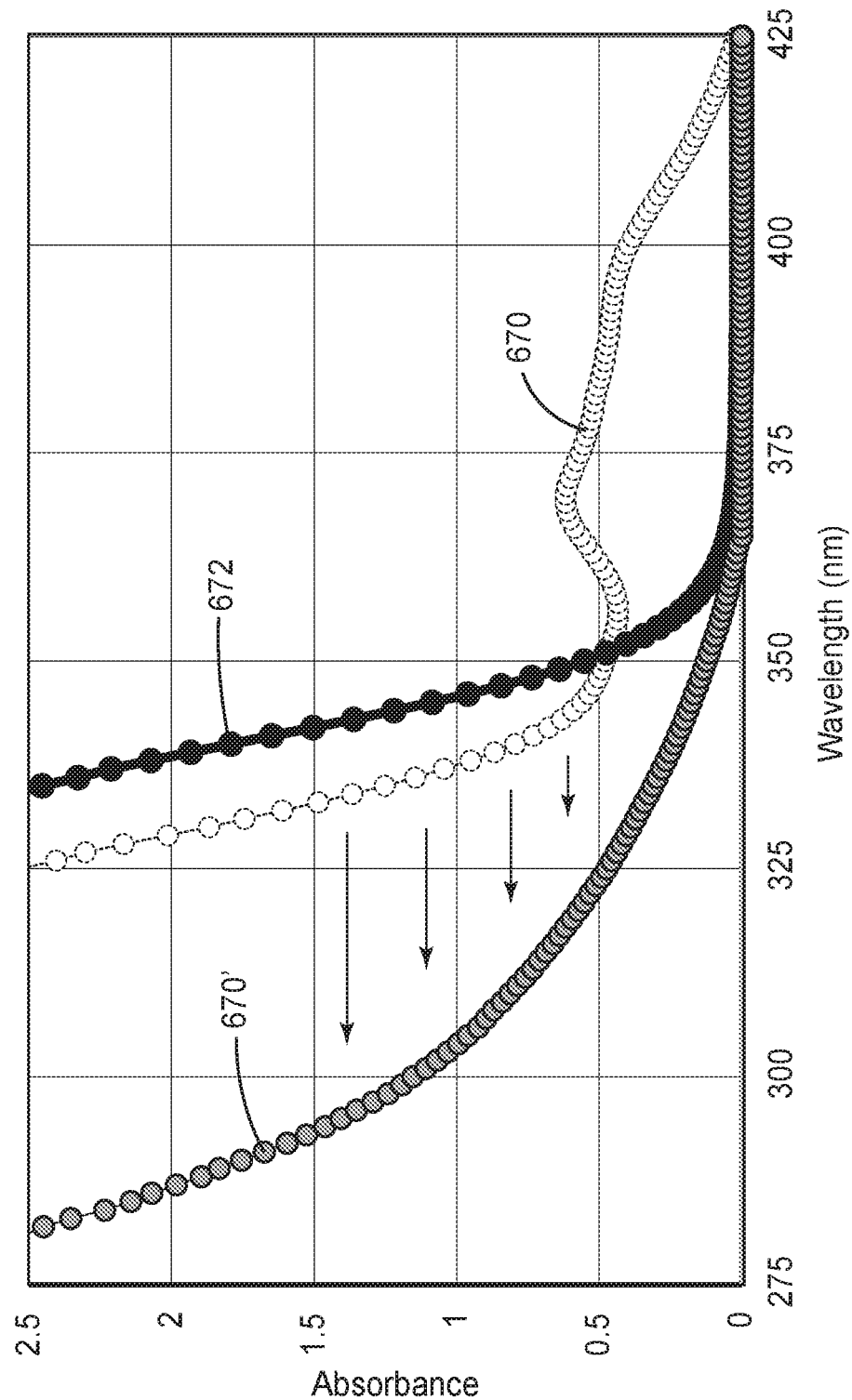
FIG. 7 is a light absorption curve for the photoinitiators of FIG. 6 following the activation of one of the photoinitiators.

FIGS. 6 and 7 show absorption characteristics of a free radical photoinitiator (IRGACURE 819, BASF SE, Ludwigshafen, Germany) compared on the same chart with that of a photoacid generator (UVI 6976, Aceto Corporation, New York, N.Y.). These absorption curves were provided by the manufacturer and measured by UV spectroscopy in acetonitrile solution (at a concentration of approximately 0.064 wt % for IRGACURE 819 and approximately 0.16 wt % for UVI 6976). As will be explained, this pair of photoinitiators enables the first and second curing reactions to be effectively triggered independently from each other.

In FIG. 6, the free radical photoinitiator is represented by absorption spectrum 670, while the photoacid generator is represented by absorption spectrum 672. The first actinic light source, a UV LED light, shows a spectral output 674 centered around 405 nm, also shown in this figure. As shown, the level of absorption of the UV LED light at 405 nm is negligible for the photoacid generator (spectrum 672) but is significant for the free radical photoinitiator (spectrum 670).

FIG. 7 shows the blue shift in absorption curve of the free radical photoinitiator that occurs after the first curing reaction has taken place. As represented by the arrows, the absorption spectrum 670, corresponding to the free radical photoinitiator, shifts to shorter wavelengths. Advantageously, this allows the photoacid generator (spectrum 672) to be initiated at intermediate wavelengths (for example, in the range of 350-365 nm) where the blue-shifted free radical photoinitiator does not shade the photoacid generator. This enables a high degree of energy efficiency in activating both photoinitiators. This in turn minimizes the required exposure time, generates less heat, and ultimately reduces costs incurred by both the manufacturer and customer.

Adhesive Compositions

The adhesive layer can be made from any of a number of useful light-activated adhesives having high strength and adhesion properties. Preferred light-activated adhesives are UV-activated adhesives.

Exemplary UV-activated adhesives can be made from a mixture of a plurality of resin components and additives using any of a number of known methods. Preferably, the adhesives are prepared using a hot melt process, which avoids use of volatile solvents. Volatile solvents are often undesirable because of costs associated with procurement, handling and disposal of these components. A hot melt process can be carried out using either a batch or continuous process so long as the adhesive components are sufficiently mixed.

Various components of a curable composition, along with their respective options and advantages, are described under the subheadings below.

Free Radical-Polymerizable Resins

The uncured adhesive contains at least one free radical-polymerizable resin. The free radical-polymerizable resin is comprised of a monomer containing one or more free radical active functional groups, and a photoinitiator capable of initiating polymerization of the free radical active functional group.

Ethylenically Unsaturated Monomers, Generally

Free radical-polymerizable resins include monomers, broadly encompassing oligomers and polymers, that contain an ethylenically unsaturated chemical group and can undergo addition polymerization. Monomers in this category generally include acrylates, methacrylates, styrenes, conjugated dienes and polyenes, and combinations thereof.

Useful (meth)acrylates, for example, include mono-, di- or poly-acrylates and methacrylates such as methyl acrylate, methyl methacrylate, ethyl acrylate, isopropyl methacrylate, n-hexyl acrylate, stearyl acrylate, allyl acrylate, glycerol diacrylate, glycerol triacrylate, hexanediol diacrylate, ethyleneglycol diacrylate, diethyleneglycol diacrylate, triethyleneglycol dimethacrylate, 1,3-propanediol diacrylate, 1,3-propanediol dimethacrylate, trimethylolpropane triacrylate, 1,2,4-butanetriol trimethacrylate, 1,4-cyclohexanediol diacrylate, pentaerythritol triacrylate, pentaerythritol tetraacrylate, pentaerythritol tetramethacrylate, sorbitol hexacrylate, and urethane diacrylates. Also included are bis-acrylates and bis-methacrylates of polyethylene glycols of molecular weights ranging from 200-500 g/mol, acrylated monomers such as those in U.S. Pat. No. 4,652,274 (Boettcher et al.), acrylated oligomers such as those of U.S. Pat. No. 4,642,126 (Zador et al.), vinyl compounds such as diallyl phthalate, divinyl succinate, divinyl adipate and divinylphthalate. Mixtures of two or more of these free radically polymerizable materials can be used if desired.

The free radical-polymerizable resin can also contain a functional group enabling the resin to undergo further reaction when the partially cured adhesive is irradiated with the second actinic light source. For example, the free radical-polymerizable resin may include a monomer with a hydroxyl group capable of participating in a subsequent cationic polymerization. Through this mechanism, it is possible to covalently link together two crosslinked networks, one formed by a free radical polymerization and the other formed by a cationic polymerization.

The amount of free radical-polymerizable resin desired in the curable composition depends to a large degree on its chemical structure and, in particular, its functionality. For example, a trifunctional monomer can be present in a lesser amount than a difunctional monomer to achieve the same degree of crosslinking. The amount further depends on other components in the formulation and the desired properties of the adhesive in its partially cured (or B-stage) condition.

In a given formulation, the free radical polymerizable resin could include all monofunctional free radical polymerizable resins, all polyfunctional free radical polymerizable resins, or some combination of the two.

It is preferable that the curable composition contains one or more free radical-polymerizable resins in an amount of at least 0.01 parts, at least 0.02 parts, at least 0.05 parts, at least 0.1 parts, at least 0.2 parts, at least 0.5 parts, at least 1 part, at least 2 parts, or at least 5 parts by weight based on 100 parts total weight of monomers/copolymers in the curable composition. The curable composition can contain one or more free radical-polymerizable resins in an amount of up to 70 parts, up to 50 parts, up to 25 parts, 10 parts, up to 8 parts, up to 5 parts, up to 3 parts, or up to 1 part by weight based on 100 parts total weight of monomers/copolymers in the curable composition.

Cationically-Polymerizable Resins

The curable composition further contains at least one cationically-polymerizable resin. The cationically-polymerizable resin is generally comprised of a monomer containing a cationically-active functional group, and a photoinitiator capable of initiating polymerization of the cationically-active functional group.

Epoxy Resins

In preferred embodiments, the cationically-polymerizable resin comprises one or more epoxy resins, which are reactive molecules characterized by epoxide functional groups. Epoxy resins or epoxides that are useful in the composition of the present disclosure may be any organic compound having at least one oxirane ring polymerizable by a ring opening mechanism.

The epoxy resins can be monomeric or polymeric, and aliphatic, cycloaliphatic, heterocyclic, aromatic, hydrogenated, or mixtures thereof. Preferred epoxides contain more than 1.5 epoxide groups per molecule and preferably at least 2 epoxide groups per molecule.

The epoxy resin can include linear polymeric epoxides having terminal epoxy groups (e.g., a diglycidyl ether of a polyoxyalkylene glycol), polymeric epoxides having skeletal epoxy groups (e.g., polybutadiene poly epoxy), polymeric epoxides having pendant epoxy groups (e.g., a glycidyl methacrylate polymer or copolymer), or a mixture thereof. Epoxide-containing materials include compounds having the general formula:

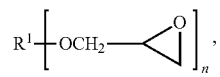

where $R^1$ is an alkyl, alkyl ether, or aryl group and n ranges from 1 to 6.

Epoxy resins include aromatic glycidyl ethers, e.g., such as those prepared by reacting a polyhydric phenol with an excess of epichlorohydrin, cycloaliphatic glycidyl ethers, hydrogenated glycidyl ethers, and mixtures thereof. Such polyhydric phenols may include resorcinol, catechol, hydroquinone, and the polynuclear phenols such as p,p'-dihydroxydibenzyl, p,p'-dihydroxydiphenyl, p,p'-dihydroxyphenyl sulfone, p,p'-dihydroxybenzophenone, 2,2'-dihydroxy-1, 1-dinaphthylmethane, and the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane.

Other useful epoxy resins are polyhydric phenolic formaldehyde condensation products as well as polyglycidyl ethers that contain as reactive groups only epoxy groups or hydroxy groups. Useful curable epoxy resins are also described in various publications including, for example, "Handbook of Epoxy Resins" by Lee and Nevill, McGraw-Hill Book Co., New York (1967), and Encyclopedia of Polymer Science and Technology, 6, p. 322 (1986).

The choice of epoxy resin can depend upon the intended end use of the structural bonding adhesive. For example, epoxides with flexible backbones may be desired where a greater amount of ductility is needed in the bond line. Materials such as diglycidyl ethers of bisphenol A and diglycidyl ethers of bisphenol F can help impart desirable structural adhesive properties upon curing, while hydrogenated versions of these epoxies may be useful for compatibility with substrates having oily surfaces.

Examples of commercially available epoxides useful in the present disclosure include diglycidyl ethers of bisphenol A (e.g., those available under the trade names EPON™ 828, EPON™ 1001, EPON™ 1004, EPON™ 2004, EPON™ 1510, and EPON™ 1310 from Momentive Specialty Chemicals, Inc., Waterford, N.Y. and those under the trade designations D.E.R.™ 331, D.E.R.™ 332, D.E.R.™ 334, and D.E.N.™ 439 available from Dow Chemical Co., Midland, Mich.); diglycidyl ethers of bisphenol F (that are available, e.g., under the trade designation ARALDITE™ GY 281 available from Huntsman Corporation); silicone resins containing diglycidyl epoxy functionality; flame retardant epoxy resins (e.g., that are available under the trade designation D.E.R.™ 560, a brominated bisphenol type epoxy resin available from Dow Chemical Co.); and 1,4-butanediol diglycidyl ethers.

Epoxy containing compounds having at least one glycidyl ether terminal portion, and preferably, a saturated or unsaturated cyclic backbone may be added to the composition as reactive diluents. Reactive diluents may be added for various purposes such as to aid in processing, e.g., to control the viscosity in the composition as well as during curing, improve flexibility of the cured composition, and/or improve compatibility of the materials in the composition.

Examples of reactive diluents include: diglycidyl ether of cyclohexanedimethanol, diglycidyl ether of resorcinol, p-tert-butyl phenyl glycidyl ether, cresyl glycidyl ether, diglycidyl ether of neopentyl glycol, triglycidyl ether of trimethylolethane, triglycidyl ether of trimethylolpropane, triglycidyl p-amino phenol, N,N'-diglycidylaniline, N,N, N'N'-tetraglycidyl meta-xylylene diamine, and vegetable oil polyglycidyl ether. Reactive diluents are commercially available as HELOXY™ 107 and CARDURA™ N10 from Momentive Specialty Chemicals, Inc., Waterford, N.Y. The composition may also contain a toughening agent to enhance overlap shear, peel resistance, and/or impact strength.

The curable composition preferably contains one or more epoxy resins having an epoxy equivalent weight of from 100 g/mol to 1500 g/mol. More preferably, the curable composition contains one or more epoxy resins having an epoxy equivalent weight of from 300 g/mol to 1200 g/mol. Even more preferably, the curable composition contains two or more epoxy resins, wherein at least one epoxy resin has an epoxy equivalent weight of from 300 g/mol to 500 g/mol, and at least one epoxy resin has an epoxy equivalent weight of from 1000 g/mol to 1200 g/mol.

The curable composition can include one or more epoxy resins in an amount of at least 10, at least 20, at least 25, at least 30, at least 35, at least 40, at least 50 parts, or at least 55 parts by weight, based on the 100 parts total weight of the curable composition. In desirable embodiments, the one or more epoxy resins are present in an amount of up to 45, up to 50 parts, up to 60 parts, up to 65 parts, up to 75 parts, or up to 80 parts by weight, based on the 100 parts total weight of the monomers/copolymers in the curable composition.

Vinyl Ethers

Vinyl ethers, like epoxy resins, are also cationically-polymerizable. These monomers can be used as an alternative to, or in combination with, the epoxy resins disclosed herein.

The double bonds of the vinyl ether monomer have high electron density and produce stable carbocations, enabling this monomer to have high reactivity in cationic polymerizations. To avoid inhibiting the cationic polymerization, the vinyl ether monomer may be limited to those not containing nitrogen. Examples thereof include methyl vinyl ether, ethyl vinyl ether, tert-butyl vinyl ether, isobutyl vinyl ether, triethylene glycol divinyl ether, and 1,4-cyclohexane dimethanol divinyl ether. Preferred examples of the vinyl ether monomer include triethylene glycol divinyl ether and cyclohexane dimethanol divinyl ether (both sold under the trade designation RAPI-CURE by Ashland, Inc., Covington, Ky.).

Polyols

The curable composition can further include one or more polyols. The polyol can be present in an amount of at least 5 parts, at least 10 parts, or up to 15 parts relative to 100 parts total weight of monomers/copolymers in the curable composition. In some embodiments, the polyether polyol is present in an amount of up to 15 parts, up to 20 parts, or up to 30 parts relative to 100 parts total weight of monomers/ copolymers in the curable composition.

Preferably, the one or more polyols include one or more polyether polyols. Examples of polyether polyols include, but are not limited to, polyoxyethylene and polyoxypropylene glycols; polyoxyethylene and polyoxypropylene triols and polytetramethylene oxide glycols.

In the provided methods of bonding, the polyoxyalkylene polyols are can slow down the curing reaction, thereby increasing the open time of the curable composition. As used herein, the "open time" refers to the period of time after a curable composition has been irradiated, during which time the curable composition remains sufficiently uncured for a second substrate to be bonded thereto.

When both substrates of the assembly are opaque, the adhesive is generally irradiated with actinic radiation prior to adhering the substrates to each other. In these cases, an open time of at least 2 minutes after exposure to an energy dose of about 1.6 J/cm$^2$ of actinic radiation is desirable to allow for suitable workability of the structural adhesive layer. Suitable UV sources are, for example, electrodeless lamps manufactured by Heraeus Noblelight America LLC (Gaithersburg, Md.).

Suitable hydroxy-functional poly(alkylenoxy) compounds include, but are not limited to, the POLYMEG™ series of polytetramethylene oxide glycols (from Lyondellbasell, Inc., Jackson, Tenn.), the TERATHANE™ series of polytetramethylene oxide glycols (from Invista, Newark, Del.); the POLYTHF™ series of polytetramethylene oxide glycol (from BASF SE); the ARCOL™ series of polyoxypropylene polyols (from Covestro, Leverkusen, Germany) and the VORANOL™ series of polyether polyols (from Dow Chemical Co.).

Polymeric Resins

The curable composition optionally contains at least one polymeric resin that is different from the free radical-polymerizable resin and cationically-polymerizable resin previously described. The free radical-polymerizable resin and cationically-polymerizable resin are preferably miscible with each other. Further, the polymeric resin is at least partially miscible with both the cationically-polymerizable resin and free radical-polymerizable resin, and thus does not macroscopically phase separate from other components of the curable composition. As used herein, "at least partially miscible" includes the condition where polymeric resin is a microphase-separated block copolymer and only one block of the block copolymer is miscible.

Preferably, the polymeric resin has a weight average molecular weight of at least 5,000 g/mol, at least 6,000 g/mol, at least 7,500 g/mol, at least 8,000 g/mol, at least 10,000 g/mol, at least 50,000 g/mol, or at least 100,000 g/mol. The polymeric resin can have a weight average molecular weight of up to 500,000 g/mol, up to 600,000 g/mol, up to 750,000 g/mol, up to 900,000 g/mol, or up to 1,000,000 g/mol.

The polymeric resin or resins are useful in providing the partially cured adhesive with an acceptable texture or firmness. As a further advantage, the addition of a polymeric resin to the curable composition can improve the dynamic overlap shear strength and/or decrease the cold flow of the adhesive layer. The polymeric resin(s) can optionally be reactive with either or both of: i) the free-radically polymerizable monomer and free-radical photoinitiator; and ii) the cationically-polymerizable monomer and the cationic photoinitiator.

Exemplary polymeric resins can have at least one and, in some cases, at least two hydroxyl groups. For the sake of clarity, the term "polymeric resin" does not include the polyether polyols described above. Desirably, the polymeric resin are substantially free of other "active hydrogen" containing groups such as amino and mercapto moieties. Further, the polymeric resin or polymers are preferably substantially free of groups that are thermally and/or photolytically unstable, such that the compounds will not decompose when exposed to actinic radiation and/or heat during curing.

The total amount of polymeric resins present in the curable composition can vary considerably depending on the desired properties of the structural adhesive layer. The curable composition can include one or more polymeric resin in an amount of at least 5 parts, at least 10 parts, at least 15 parts, at least 20 parts, or at least 25 parts by weight, based on 100 parts total weight of monomers/copolymers present in the curable composition. In some embodiments, the polymeric resin (or resins) can be present in an amount of up to 100 parts, up to 50 parts, or up to 25 parts, based on 100 parts total weight of monomers/copolymers present in the curable composition.

The polymeric resin may be selected from acrylic polymers, polyesters, polyester polyols, phenoxy resins, EVA copolymers, polycaprolactone polyols, and polyvinyl acetal resins. Some of these are further described below.

Tetrahydrofurfuryl (Meth)Acrylate ("THFA") Copolymers

Optionally, the curable composition comprises a THFA copolymer component. This component is a copolymer of tetrahydrofurfuryl (meth)acrylate, a $C_1$-$C_8$ (meth)acrylate ester and an optional cationically reactive functional (meth)acrylate.

The copolymer further comprises a $C_1$-$C_8$ alkyl (meth)acrylate ester monomer. Useful monomers include the acrylates and methacrylate of methyl, ethyl, propyl, isopropyl, butyl, pentyl, hexyl, heptyl and octyl alcohols, including all isomers, and mixtures thereof. It is preferred that the alcohol is selected from $C_3$-$C_6$ alkanols, and in certain embodiments, the carbon number molar average of the alkanols is $C_3$-$C_6$. It has been found that within this range the copolymer has sufficient miscibility with the epoxy resin component and it allows for adhesive compositions having a useful overall balance of adhesive properties, including overlap shear adhesion.

In reference to the above descriptions, the carbon number molar average may be calculated by summing the number of moles of each alkanol ($C_1$-$C_8$ alkanols) multiplied by the carbon number of each alkanol, and dividing the result by the total number of moles of alkanols: i.e., $\Sigma_{\alpha\text{-}\omega}[(\#\text{ moles of alkanol}) \times (\#\text{ carbon atoms for alkanol})]/\#\text{ moles of alkanols }\alpha\text{ to }\omega$.

The THFA copolymer can incorporate a cationically reactive monomer, i.e., a (meth)acrylate monomer having a cationically reactive functional group. Such monomers could include, for example, glycidyl acrylate, glycidyl methacrylate, hydroxyethyl acrylate, hydroxyethyl methacrylate, hydroxypropyl methylacrylate, hydroxybutyl acrylate or an alkoxysilylalkyl (meth)acrylate, such as trimethoxysilylpropyl acrylate.

Advantageously, THFA is polar, which helps provide miscibility with any epoxy resins present in the cationically-polymerizable resin. Preferably, the copolymer contains essentially no acid functional monomers, whose presence could initiate polymerization of the epoxy resin prior to UV curing. For the same reason, it is preferred that the copolymer not contain any amine-functional monomers. Furthermore, it is preferred that the copolymer not contain any acrylic monomers having moieties sufficiently basic so as to inhibit cationic cure of the curable composition.

The THFA copolymer generally comprises polymerized monomer units of:
(A) 40-60 wt %, and preferably 50-60 wt %, of tetrahydrofurfuryl (meth)acrylate; (B) 40-60 wt %, and preferably 40-50 wt %, of $C_1$-$C_8$ (preferably $C_3$-$C_6$) alkyl (meth)acrylate ester monomers; and (C) 0-10 wt %, and preferably 0-5 wt % of cationically reactive functional monomers, wherein the sum of A)-C) is 100 wt %.

Polyesters

Polymeric resins useful in the curable composition include polyesters. Suitable polyester components include semi-crystalline polyesters as well as amorphous and branched polyesters. Polyesters include polycaprolactones and polyesters terminated with hydroxyl and carboxyl groups, and may be amorphous or semi-crystalline at room temperature. Preferred polyesters include hydroxyl-terminated polyesters that are semi-crystalline at room temperature. A material that is "amorphous" has a glass transition temperature but does not display a measurable crystalline melting point as determined on a differential scanning calorimeter ("DSC"). Preferably, the glass transition temperature is less than about 100° C. A material that is "semi-crystalline" displays a crystalline melting point as determined by DSC, preferably with a maximum melting point of about 120° C.

Crystallinity in a polymer can also be reflected by the clouding or opaqueness of a sheet that had been heated to an amorphous state as it cools. When the polyester polymer is heated to a molten state and knife-coated onto a liner to form a sheet, it is amorphous and the sheet is observed to be clear and fairly transparent to light. As the polymer in the sheet material cools, crystalline domains form and the crystallization is characterized by the clouding of the sheet to a translucent or opaque state. The degree of crystallinity may be varied in the polymers by mixing in any compatible combination of amorphous polymers and semi-crystalline polymers having varying degrees of crystallinity. It is generally preferred that material heated to an amorphous state be allowed sufficient time to return to its semi-crystalline state before use or application. The clouding of the sheet provides a convenient non-destructive method of determining that crystallization has occurred to some degree in the polymer.

The polymers may include nucleating agents to increase the rate of crystallization at a given temperature. Useful nucleating agents include microcrystalline waxes. A suitable wax could include an alcohol comprising a carbon chain having a length of greater than 14 carbon atoms (CAS #71770-71-5) or an ethylene homopolymer (CAS #9002-88-4) sold by Baker Hughes, Houston, Tex., as UNILIN™ 700.

Preferred polyesters are solid at room temperature. Preferred polyester materials have a number average molecular weight of about 7,500 g/mol to 200,000 g/mol, more preferably from about 10,000 g/mol to 50,000 g/mol, and most preferably from about 15,000 g/mol to 30,000 g/mol.

Useful polyesters include the reaction product of dicarboxylic acids (or their diester equivalents) and diols. The diacids (or diester equivalents) can be saturated aliphatic acids containing from 4 to 12 carbon atoms (including branched, unbranched, or cyclic materials having 5 to 6 carbon atoms in a ring) and/or aromatic acids containing from 8 to 15 carbon atoms. Examples of suitable aliphatic acids are succinic, glutaric, adipic, pimelic, suberic, azelaic, sebacic, 1,12-dodecanedioic, 1,4-cyclohexanedicarboxylic, 1,3-cyclopentanedicarboxylic, 2-methylsuccinic, 2-methylpentanedioic, 3-methylhexanedioic acids, and the like. Suitable aromatic acids include terephthalic acid, isophthalic acid, phthalic acid, 4,4'-benzophenone dicarboxylic acid, 4,4'-diphenylmethanedicarboxylic acid, 4,4'-diphenylthioether dicarboxylic acid, and 4,4'-diphenylamine dicarboxylic acid. Preferably, the structure between the two carboxyl groups in the diacids contain only carbon and hydrogen, and more preferably, the structure is a phenylene group. Blends of the foregoing diacids may be used.

The diols include branched, unbranched, and cyclic aliphatic diols having from 2 to 12 carbon atoms. Examples of suitable diols include ethylene glycol, 1,3-propylene glycol, 1,2-propylene glycol, 1,4-butanediol, 1,3-butanediol, 1,5-pentanediol, 2-methyl-2,4-pentanediol, 1,6-hexanediol, cyclobutane-1,3-di(2'-ethanol), cyclohexane-1,4-dimethanol, 1,10-decanediol, 1,12-dodecanediol, and neopentyl glycol. Long chain diols including poly(oxyalkylene)glycols in which the alkylene group contains from 2 to 9 carbon atoms, preferably 2 to 4 carbon atoms, may also be used. Blends of the foregoing diols may be used.

Useful, commercially available hydroxyl terminated polyester materials include various saturated linear, semi-crystalline copolyesters available from Evonik Industries, Essen, North Rhine-Westphalia, Germany, such as DYNAPOL™ S1401, DYNAPOL™ S1402, DYNAPOL™ S1358, DYNAPOL™ S1359, DYNAPOL™ S1227, and DYNAPOL™ S1229. Useful saturated, linear amorphous copolyesters available from Evonik Industries include DYNAPOL™ 1313 and DYNAPOL™ S1430.

Additional useful polyester resins include the TONE™ series of polycaprolactone polyols series available from Dow Chemical Co., the CAPA™ series of polycaprolactone polyols from Perstorp Inc., Perstorp, Sweden, and the DESMOPHEN™ series of saturated polyester polyols from Covestro, such as DESMOPHEN™ 631A 75.

The adhesive may include one or more polyesters in an amount that varies depending on the desired properties of the adhesive layer. The adhesive can include one or more polyesters in an amount of up to 50 percent by weight, based on the total weight of monomers/copolymers in the curable composition. Where present, the one or more polyesters are preferably present in an amount of at least 5 percent, at least 7 percent, at least 8 percent, at least 10 percent, at least 12 percent, at least 15 percent, or at least 20 percent by weight based on the total weight of monomers/copolymers in the curable composition.

Other Polymeric Resins

Useful polymeric resins also include phenoxy resins, and preferably hydroxy-containing phenoxy resins. Desirable phenoxy resins include those derived from the polymerization of a diglycidyl bisphenol compound. Typically, the phenoxy resin has a number average molecular weight of less than 60,000 g/mol, desirably in the range of 20,000 g/mol to 30,000 g/mol. Commercially available phenoxy resins include, but are not limited to, PAPHEN™ PKHP-200, available from Inchem Corp., Rock Hill, S.C. and the SYN FAC™ series of polyoxyalkylated bisphenol A from Milliken Chemical, Spartanburg, S.C.) such as SYN FAC™ 8009, 8024, 8027, 8026, and 8031.

EVA copolymer resins are also useful polymeric resins. In some cases these resins may contain small amounts of free hydroxyl groups, enabling EVA copolymers to be further deacetylated during cationic polymerization. Hydroxyl-containing EVA resins can be obtained, for example, by partially hydrolyzing a precursor EVA copolymer.

Suitable EVA copolymer resins include, but are not limited to, EVA copolymer resins. In one embodiment, the EVA copolymer comprises an EVA copolymer containing at least 28 percent by weight vinyl acetate, desirably at least 40 percent by weight vinyl acetate, more desirably at least 50 percent by weight vinyl acetate, and even more desirably at least 60 percent by weight vinyl acetate by weight of the copolymer. In a further embodiment, the EVA copolymer contains an amount of vinyl acetate ranging from 28 to 99 weight percent of vinyl acetate, desirably from 40 to 90 weight percent of vinyl acetate, more desirably from 50 to 90 weight percent of vinyl acetate, and even more desirably from 60 to 80 weight percent vinyl acetate in the copolymer.

Examples of commercially available EVA copolymers include, but are not limited to, the ELVAX™ series, including ELVAX™ 150, 210, 250, 260, and 265 from E. I. Du Pont de Nemours and Co., Wilmington, Del., ATEVA™ series from Celanese, Inc., Irving, Tex.); LEVAPREN™ 400 from Lanxess Corp., Cologne, Germany, including LEVAPREN™ 450, 452, and 456 (45 weight percent vinyl acetate); LEVAPREN™ 500 HV (50 weight percent vinyl acetate); LEVAPREN™ 600 HV (60 weight percent vinyl acetate); LEVAPREN™ 700 HV (70 weight percent vinyl acetate); and LEVAPREN™ KA 8479 (80 weight percent vinyl acetate), each from Lanxess Corp., Cologne, Germany.

Free Radical Photoinitiators

As shown in FIGS. 1 and 3, the first photoinitiator should be sensitive to radiation from the first actinic light source. The first photoinitiator is preferably a free radical photoinitiator capable of initiating polymerization of free radical active functional groups, but not cationically-active functional groups. Such free radical-generating photoinitiators may be optionally combined with a photosensitizer or accelerator. Such initiators typically are capable of generating free radicals for addition polymerization at some wavelength between 200 and 800 nm.

The free-radical initiator used need not be particularly limited. Examples of such initiators include alpha aminoketones, alpha hydroxyketones, phosphine oxides, phenylglyoxalates, thioxanthones, benzophenones, benzoin ethers, oxime esters, benzil ketals, amine synergists, maleimides, and combinations thereof.

Useful phosphine oxides include acylphosphine oxides, as described in U.S. Pat. No. 4,737,593 (Ellrich et al.). Such acylphosphine oxides include compounds having one of the following formulas:

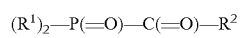

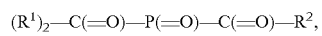

wherein each R individually can be a hydrocarbyl group such as alkyl, cycloalkyl, aryl, and aralkyl, any of which can be substituted with a halo-, alkyl- or alkoxy-group, or the two $R^1$ groups can be joined to form a ring along with the phosphorous atom, and wherein
$R^2$ is a hydrocarbyl group, an S-, O-, or N-containing five- or six-membered heterocyclic group, or a —Z—C(=O)—P(=O)—$(R^1)_2$ group, wherein Z represents a divalent hydrocarbyl group such as alkylene or phenylene having from 2 to 6 carbon atoms.

Preferred acylphosphine oxides useful in the invention are those in which the $R^1$ and $R^2$ groups are phenyl or lower alkyl- or lower alkoxy-substituted phenyl. Here, "lower alkyl" and "lower alkoxy" refers to groups having from 1 to 4 carbon atoms. A particularly preferred acylphosphine oxide is bis(2,4,6-trimethylbenzoyl)phenyl phosphine oxide, provided under the trade designation IRGACURE™ 819, BASF SE).

The free radical photoinitiator used to provide the partially cured adhesive is generally present in an amount of at least 0.01 parts, at least 0.02 parts, at least 0.05 parts, at least 0.1 parts, at least 0.5 parts, or at least 1 part by weight relative to 100 parts by weight of total monomer/copolymer in the curable composition. The free radical photoinitiator can be used in an amount of up to 5 parts, up to 3 parts, up to 2 parts, up to 1 part, up to 0.3 parts, or up to 0.1 parts by weight relative to 100 parts by weight of total monomer/copolymer in the curable composition.

Cationic Photoinitiators

Useful cationic photoinitiators include ionic photoacid generators. When used to initiate cationic polymerizations, they can also be referred to as cationic photoinitiators.

The photoacid generator can be an ionic photoacid generator. Ionic photoacid generators include onium salts, such as bis(4-t-butylphenyl) iodonium hexafluoroantimonate (FP5034™ from Hampford Research Inc., Stratford, Conn.), a mixture of triarylsulfonium salts (diphenyl(4-phenylthio) phenylsufonium hexafluoroantimonate, bis(4-(diphenylsulfonio)phenyl)sulfide hexafluoroantimonate) available as Syna PI-6976™ from Synasia Metuchen, N.J., (4-methoxyphenyl)phenyl iodonium triflate, bis(4-tert-butylphenyl) iodonium camphorsulfonate, bis(4-tert-butylphenyl) iodonium hexafluoroantimonate, bis(4-tert-butylphenyl) iodonium hexafluorophosphate, bis(4-tert-butylphenyl) iodonium tetraphenylborate, bis(4-tert-butylphenyl) iodonium tosylate, bis(4-tert-butylphenyl) iodonium triflate, ([4-(octyloxy)phenyl]phenyliodonium hexafluorophosphate), ([4-(octyloxy)phenyl]phenyliodonium hexafluoroantimonate), (4-isopropylphenyl)(4-methylphenyl)iodonium tetrakis(pentafluorophenyl) borate (available as Rhodorsil 2074™ from Bluestar Silicones, East Brunswick, N.J.), bis(4-methylphenyl) iodonium hexafluorophosphate (available as Omnicat 440™ from IGM Resins Bartlett, Ill.), 4-(2-hydroxy-1-tetradecycloxy) phenyl]phenyl iodonium hexafluoroantimonate, triphenyl sulfonium hexafluoroantimonate (available as CT-548™ from Chitec Technology Corp. Taipei, Taiwan), diphenyl(4-phenylthio)phenylsufonium hexafluorophosphate, bis(4-(diphenylsulfonio)phenyl)sulfide bis(hexafluorophosphate), diphenyl(4-phenylthio)phenylsufonium hexafluoroantimonate, bis(4-(diphenylsulfonio)phenyl)sulfide hexafluoroantimonate, and blends of these triarylsulfonium salts available from Synasia, Metuchen, N.J. as SYNA™ PI-6992 and SYNA™ PI-6976 for the $PF_6$ and $SbF_6$ salts, respectively. Similar blends of ionic photoacid generators are available from Aceto Pharma Corporation, Port Washington, N.Y. under the tradenames UVI-6992 and UVI-6976.

The photoinitiator is used in amounts sufficient to induce the desired degree of crosslinking in the partially cured adhesive. The desired degree of crosslinking may vary, however, depending on the desired adhesive properties and the film thickness. The amount of the photoinitiator necessary to effect the desired degree of crosslinking will depend on the quantum yield of the photoinitiator (the number of molecules of acid released per photon absorbed), the permeability of the polymer matrix, the wavelength and duration of irradiation and the temperature.

Generally, the photoacid generator is present in an amount of at least 0.001 parts, at least 0.01 parts, at least 0.05 parts, at least 0.1 parts, at least 0.2 parts, or at least 0.25 parts by weight relative to 100 parts by weight of total monomer/copolymer in the curable composition. The photoacid generator can be present in an amount of up to 5 parts, up to 3 parts, up to 2 parts, up to 1 part, up to 0.5 parts, or up to 0.1 parts by weight relative to 100 parts by weight of total monomer/copolymer in the curable composition.

Optional Additives

The curable composition may further contain any of a variety of optional additives known in the art. Such additives may be homogeneous or heterogeneous with respect to one or more components in the curable composition. Heterogeneous additives may be discrete (e.g., particulate) or continuous in nature (e.g., a scrim).

Such additives can include, for example, fillers, stabilizers, plasticizers, tackifiers, flow control agents, cure rate retarders, adhesion promoters (for example, silanes and titanates), resins, impact modifiers, expandable microspheres, thermally conductive particles, electrically conductive particles, and the like, such as silica, glass, clay, talc, pigments, colorants, glass beads or bubbles, and antioxidants, so as to reduce the weight and/or cost of the structural adhesive layer composition, adjust viscosity, and/or provide additional reinforcement or modify the thermal conductivity of curable compositions and articles used in the provided methods so that a more rapid or uniform cure may be achieved.

Not intended to be exhaustive, further embodiments of the structural bonding adhesive methods, compositions, and articles are enumerated as follows:

1. A method of making a structural bonding adhesive comprising: mixing a first curable resin and a second curable resin to provide an uncured adhesive; and irradiating the uncured adhesive using a first actinic light source to polymerize the first curable resin selectively without polymerizing the second curable resin thereby providing a partially cured adhesive with reduced cold flow creep under ambient conditions, wherein the partially cured adhesive is a pressure-sensitive adhesive and is capable of being fully cured by irradiating the partially cured adhesive using a second actinic light source different from the first actinic light source to polymerize the second curable resin.

2. The method of making a structural bonding adhesive according to embodiment 1, wherein the partially cured adhesive is dimensionally stable.

3. The method of making a structural bonding adhesive according to embodiment 1 or 2, wherein the first curable resin comprises: a monomer containing an ethylenically unsaturated functional group; and a first photoinitiator capable of initiating polymerization of the ethylenically unsaturated functional group.

4. The method of making a structural bonding adhesive according to any one of embodiments 1-3, wherein the first actinic light source is an ultraviolet light or visible light source.

5. The method of making a structural bonding adhesive according to embodiment 4, wherein the first actinic light source produces a peak intensity at a wavelength of from 380 nm to 420 nm and an excitation dose of from 200 $mJ/cm^2$ through 6400 $mJ/cm^2$.

6. The method of making a structural bonding adhesive according to embodiment 5, wherein the first actinic light source produces a peak intensity at a wavelength of from 386 nm to 418 nm and an excitation dose of from 300 $mJ/cm^2$ through 4800 $mJ/cm^2$.

7. The method of making a structural bonding adhesive according to embodiment 6, wherein the first actinic light source produces a peak intensity at a wavelength of from 393 nm to 417 nm and an excitation dose of from 400 $mJ/cm^2$ through 3200 $mJ/cm^2$.

8. The method of making a structural bonding adhesive according to any one of embodiments 1-7, wherein the second curable resin comprises: a monomer containing a cationically-active functional group; and a second photoinitiator capable of initiating polymerization of the cationically-active functional group.

9. The method of making a structural bonding adhesive according to any one of the embodiments 1-8, wherein the curable composition comprises: a) a cationically curable resin; b) optionally, a polyol; c) a polyfunctional (meth) acrylate; d) optionally, a polymeric resin at least partially miscible with a)-c); e) a free radical photoinitiator sensitive to radiation from the first actinic light source; and f) a photoacid generator sensitive to radiation from the second actinic light source.

10. The method of making a structural bonding adhesive according to embodiment 9, wherein the curable composition comprises: a) in the range of 10-80 parts of one or more epoxy resins; b) in the range of 0-20 parts of one or more polyols; c) in the range of 0-5 parts of one or more polyfunctional meth(acrylates); d) in the range of 0-50 parts of one or more polymeric resins at least partially miscible with a)-c), wherein the sum of a)-d) is 100 parts per weight; e) in the range of 0.02-5 parts of a free radical photoinitiator; and f) in the range of 0.05-5 parts of a photoacid generator.

11. The method of making a structural bonding adhesive according to any one of embodiments 1-10, further comprising disposing the uncured adhesive onto a release liner prior to irradiating the uncured adhesive using the first actinic light source.

12. A structural bonding adhesive made by the method of any one of embodiments 1-11.

13. The structural bonding adhesive of embodiment 12 wherein the structural bonding adhesive displays a shelf life of at least 5 days, measured from the formation of the partially cured adhesive.

14. The structural bonding adhesive of embodiment 13, wherein the structural bonding adhesive has a shelf life of at least 180 days, measured from the formation of the partially cured adhesive.

15. The structural bonding adhesive of embodiment 14, wherein the structural bonding adhesive has a shelf life of at least 360 days, measured from the formation of the partially cured adhesive.

16. A method of bonding hardware to a substrate comprising: disposing the partially cured adhesive of any one of embodiments 1-11 on a bonding surface of either the hardware or the substrate; either before or after disposing the partially cured adhesive on the bonding surface, irradiating the partially cured adhesive using the second actinic light source to initiate polymerization of the second curable resin; placing the hardware so as to be bonded to the substrate by the partially cured adhesive; and allowing the partially cured adhesive to fully cure as the second curable resin polymerizes.

17. The method of bonding hardware to a substrate according to embodiment 16, wherein the second actinic light source is an ultraviolet actinic light source.

18. The method of bonding hardware to a substrate according to embodiment 16 or 17, wherein the second actinic light source produces a peak intensity at a wavelength of from 200 nm to 380 nm.

19. The method of bonding hardware to a substrate according to embodiment 18, wherein the second actinic light source produces a peak intensity at a wavelength of from 300 nm to 377 nm.

20. The method of bonding hardware to a substrate according to embodiment 19, wherein the second actinic light source produces a peak intensity at a wavelength of from 356 nm to 374 nm.

21. The method of bonding hardware to a substrate according to any one of embodiments 16-20, wherein the first and second actinic light sources have respective peak intensities at respective wavelengths separated by from 10 nm to 100 nm.

22. The method of bonding hardware to a substrate according to embodiment 21, wherein the first and second actinic light sources have respective peak intensities at respective wavelengths separated by from 20 nm to 60 nm.

23. The method of bonding hardware to a substrate according to embodiment 22, wherein the first and second actinic light sources have respective peak intensities at respective wavelengths separated by from 35 nm to 45 nm.

24. The method of bonding hardware to a substrate according to any one of embodiments 16-23, wherein radiation from the second actinic light source passes through either the hardware or the substrate.

25. The method of bonding hardware to a substrate according to any one of embodiments 16-24, further comprising die cutting the partially cured adhesive prior to disposing the partially cured adhesive on the bonding surface.

26. The method of bonding hardware to a substrate according to embodiment 25, wherein the partially cured adhesive is die cut at ambient temperature or higher.

27. A method of bonding hardware to a substrate comprising:
disposing a partially cured adhesive on a bonding surface of either the hardware or the substrate, the partially cured adhesive comprising the reaction product of a curable composition irradiated by a first actinic light source, the curable composition comprised of:
  a) a free radical-polymerizable resin;
  b) a cationically-polymerizable resin;
  c) a free radical photoinitiator sensitive to radiation from the first actinic light source; and
  d) a photoacid generator sensitive to radiation from a second actinic light source different from the first actinic light source;
either before or after disposing the partially cured adhesive on the bonding surface, irradiating the partially cured adhesive using the second actinic light source;
placing the hardware so as to be bonded to the substrate by the partially cured adhesive; and
allowing the partially cured adhesive to fully cure.

28. The method of bonding hardware to a substrate according to embodiment 27, wherein the free radical-polymerizable resin comprises at least one polyfunctional compound.

29. The method of bonding hardware to a substrate according to embodiment 27 or 28, wherein the free radical-polymerizable resin includes a monomer containing a hydroxyl group or epoxy group.

30. The method of bonding hardware to a substrate according to any one of embodiments 27-29, wherein the partially cured adhesive displays a cold flow creep recovery of at least 50 percent as measured according to Creep and Creep-Recovery Test 1.

31. The method of bonding hardware to a substrate according to any one of embodiments 27-30, wherein the curable composition further comprises a polymeric resin at least partially miscible with a)-c).

32. The method of bonding hardware to a substrate according to any one of embodiments 27-31, wherein the curable composition further comprises a polyol.

33. The method of bonding hardware to a substrate according to embodiment 32, wherein the polyol is a polyether polyol.

34. The method of bonding hardware to a substrate according to any one of embodiments 27-33, wherein the partially cured adhesive is a pressure-sensitive adhesive.

35. The method of bonding hardware to a substrate according to any one of embodiments 27-34, wherein the curable composition comprises:
  a) in the range of 10-80 parts of one or more epoxy resins;
  b) in the range of 0-20 parts of one or more polyols;
  c) in the range of 0.01-10 parts of one or more polyfunctional meth(acrylates); d) in the range of 0-50 parts of one or more polymeric resins at least partially miscible with a)-c), wherein the sum of a)-d) is 100 parts per weight;
e) in the range of 0.02-5 parts of a free radical photoinitiator; and
f) in the range of 0.05-5 parts of a photoacid generator.

36. A curable composition for making a structural bonding adhesive, the curable composition comprising:
a free radical-polymerizable resin;
a cationically-polymerizable resin;
a free radical photoinitiator sensitive to radiation from the first actinic light source; and
a photoacid generator insensitive to radiation from the first actinic light source but sensitive to radiation from a second actinic light source, wherein the free radical-polymerizable resin and the cationically-polymerizable resin are capable of covalently bonding with each other when irradiated by the second actinic light source.

37. A curable composition for making a structural bonding adhesive, the curable composition comprising:
a) in the range of 0.1-70 parts of one or more free radical-polymerizable resins;
b) in the range of 10-80 parts one or more cationically-polymerizable resins;
c) in the range of 0-20 parts of one or more polyols;
d) in the range of 0-50 parts of one or more polymeric resins at least partially miscible with a)-c), wherein the sum of a)-d) is 100 parts per weight;
e) in the range of 0.02-5 parts of a free radical photoinitiator; and
f) in the range of 0.05-5 parts of a photoacid generator.

38. The curable composition of embodiment 37, wherein the one or more free radical-polymerizable resins comprises one or more polyfunctional free radical-polymerizable resins.

39. The curable composition of embodiment 38, wherein the one or more free radical-polymerizable resins contains 0.1-10 parts of the one or more polyfunctional free radical-polymerizable resins.

40. The curable composition of embodiment 39, wherein the one or more free radical-polymerizable resins contains 1-5 parts of the one or more polyfunctional free radical-polymerizable resins.

41. The curable composition of embodiment 40, wherein the one or more free radical-polymerizable resins contains 1.5-2.5 parts of the one or more polyfunctional free radical-polymerizable resins.

42. The curable composition of any one of embodiments 38-41, wherein the one or more free radical-polymerizable resins further comprises one or more monofunctional free radical-polymerizable resins.

43. The curable composition of embodiment 42, wherein the one or more free radical-polymerizable resins contains 0.1-70 parts of the one or more monofunctional free radical-polymerizable resins.

44. The curable composition of embodiment 43, wherein the one or more free radical-polymerizable resins contains 10-45 parts of the one or more monofunctional free radical-polymerizable resins.

45. The curable composition of embodiment 44, wherein the one or more free radical-polymerizable resins contains 20-40 parts of the one or more monofunctional free radical-polymerizable resins.

46. The curable composition of any one of embodiments 37-45, further comprising in the range of 0.1-10 parts of one or more heterogenous fillers.

47. The curable composition of any one of embodiments 37-46, wherein the one or more cationically-polymerizable resins comprise an epoxy resin, vinyl ether, cyclic ether, cyclic siloxane, isobutylene or combination thereof.

48. The curable composition of embodiment 47, wherein the one or more cationically-polymerizable resins contains 5-70 parts of one or more epoxy resins.

49. The curable composition of embodiment 48, wherein the one or more cationically-polymerizable resins contains 30-60 parts of one or more epoxy resins.

50. The curable composition of embodiment 49, wherein the one or more cationically-polymerizable resins contains 40-60 parts of one or more epoxy resins.

51. The curable composition of any one of embodiments 37-50, wherein the polyol is a polyether polyol.

52. The curable composition of any one of embodiments 37-51, wherein the curable composition contains 0.1-15 parts of the one or more polyols.

53. The curable composition of embodiment 52, wherein the curable composition contains 3-10 parts of the one or more polyols.

54. The curable composition of any one of embodiments 37-53, wherein the free radical-polymerizable resin comprises a (meth)acrylate, styrene, diene, triene, or combination thereof.

55. The curable composition of embodiment 54, wherein the free radical-polymerizable resin contains a hydroxyl group and/or a glycidyl group.

56. The curable composition of embodiment 54, wherein the free radical-polymerizable resin comprises pentaerytritol triacrylate.

57. The curable composition of embodiment 54, wherein the free radical-polymerizable resin comprises urethane diacrylate.

58. The curable composition of any one of embodiments 37-57, wherein the polymeric resin comprises an acrylic resin, polyester resin, polyethylene vinyl acetate resin, or copolymer or mixture thereof.

59. The curable composition of any one of embodiments 37-58, wherein the curable composition contains 10-50 parts of the one or more polymeric resins.

60. The curable composition of embodiment 59, wherein the curable composition contains 20-40 parts of the one or more polymeric resins.

61. The curable composition of any one of embodiments 37-60, wherein the free radical photoinitiator comprises a hydroxyl alpha-ketone, phosphine, or mixture thereof.

62. The curable composition of embodiment 61, wherein the free radical photoinitiator comprises bis(2,4,6-trimethylbenzoyl)-phenylphosphineoxide.

63. The curable composition of any one of embodiments 37-62, wherein the curable composition contains 0.01-1 parts of the free radical photoinitiator.

64. The curable composition of embodiment 63, wherein the curable composition contains 0.05-0.25 parts of the free radical photoinitiator.

65. The curable composition of any one of embodiments 37-64, wherein the photoacid generator comprises an onium salt.

66. The curable composition of embodiment 65, wherein the onium salt is a triarylsulfonium hexafluoroantimonate salt.

67. The curable composition of embodiment 65, wherein the onium salt is a triarylsulfonium hexafluorophosphate salt.

68. The curable composition of any one of embodiments 37-67, wherein the curable composition contains 0.1-1 parts of the photoacid generator. 69. The curable composition of embodiment 68, wherein the curable composition contains 0.15-0.5 parts of the photoacid generator.

70. An adhesive-backed article comprising:
   hardware having a bonding surface; and
   the structural bonding adhesive made the method of any one of embodiments 1-11 disposed on the bonding surface.
71. The adhesive-backed article of embodiment 70, wherein the hardware comprises a bracket for bonding to a windshield.
72. The adhesive-backed article of embodiment 70 or 71, further comprising a release liner disposed on a major surface of the partially cured adhesive opposite the bonding surface.

EXAMPLES

Objects and advantages of this disclosure are further illustrated by the following non-limiting examples, but the particular materials and amounts thereof recited in these examples, as well as other conditions and details, should not be construed to unduly limit this disclosure.

Unless otherwise noted, all parts, percentages, ratios, etc. in the Examples and the rest of the specification are by weight.

Test Methods

Light Exposure Conditions, Defined

"Unexposed": These specimens were analyzed after compounding without any additional light exposure (except as noted in Cleavage Section).

"405 nm Exposure": The specimen was placed under an inert atmosphere (e.g., $N_2$) for 5-15 s and then irradiated using a 405 nm LED array based on U405 LEDs from Nicha Corporation, Anan, Tokushima (having a spectral output shown in FIG. 6). Unless otherwise specified, the top release liner was removed from the specimen prior to irradiation using a dosage of 1.8 J/cm² UVA2 as measured by a Power Puck II radiometer (Electronic Instrumentation & Technology, Inc).

"350BL Exposure": The top release liner was removed and the sample was then irradiated in an ambient (non-inert) environment using a 350BL light (OSRAM SYLVANIA, Danvers, Mass.) with 400 mJ/cm² UVA as measured by a UVIRAD radiometer (Electronic Instrumentation & Technology, Inc.). After exposure, the release liner was reapplied to the open surface of the composition.

"365 nm Curing Exposure": The top release liner was removed and the sample was then irradiated in an ambient (non-inert) environment using a 365 nm LED source (CLEARSTONE TECHNOLOGIES, Hopkins, Minn., 7.5 J/cm² UVA as measured by a POWER PUCK II radiometer. The irradiated sample was then applied to glass substrate to close the bond.

Creep and Creep-Recovery

The creep and creep-recovery performance of compositions was determined using an MCR 302 rheometer (ANTON PAAR GmbH, Graz, Austria). A 0.6 mm thick sample of each composition was loaded between 25 mm parallel plates and a normal force ($F_N$) of 1 N was applied. In the "General Creep and Creep-Recovery Test," a constant stress of 1000 Pa was applied for 300 s, then a constant stress of 0 Pa was applied for 600 s. The strain at 300 s ($\gamma_{300s}$) was recorded to characterize the creep, or cold-flow of the composition and is expressed as a percentage. The strain at 900 s ($\gamma_{900s}$), total experiment time, was recorded to characterize the creep-recovery behavior of the composition and is given by the following relationship:

$$\text{Creep recovery (\%)} = [1-(\gamma_{900s}/\gamma_{300s})] \times 100$$

Creep recovery provides an indication in the elasticity of a composition. Large creep-recovery, (e.g., 100%) indicates high elasticity; small creep-recovery (e.g., <10%) indicates viscous flow.

Variations of the above test method were conducted in some cases. In "Creep and Creep-Recovery Test 1," the 1000 Pa stress above was replaced with a 5000 Pa stress. In "Creep and Creep-Recovery Test 2," the 1000 Pa stress above was replaced with a 10 Pa stress, and the stress was applied for 600 s, after which a constant stress of 0 Pa was applied for 120 s. Other aspects of these tests were unchanged.

Fourier Transform Infrared Attenuated Total Reflectance ("FTIR-ATR")

For materials made using a batch process (Comparatives A-D and Examples 1-9), Attenuated Total Reflectance ("ATR") measurements were made on a Nicolet Nexus 670 IR Spectrometer (Thermo Fisher Scientific Inc., Waltham, Mass.) with MCT/A detector and Smart OMNI single-bounce germanium ("Ge") ATR accessory. Spectra consisted of thirty-two scans with a resolution of four (data spacing=2 cm⁻¹) over the range of 650-4000 cm⁻¹.

For each ATR measurement, the release liner was peeled from the front side of the tape sample. The resulting adhesive surface was pressed down into good contact with the Ge crystal for the duration of the spectrum acquisition. Afterwards, the sample was peeled from the Ge crystal and the crystal cleaned with ethyl acetate before the next measurement.

ATR spectra of Unexposed specimens were obtained after compounding, without any additional light exposure. Compositions designated "405 nm, Initial" or "350BL, Initial" were exposed to the respective light source detailed above, subjected to rheological analysis to assess creep behavior, then ATR spectra were quickly obtained. All samples were subsequently stored at 38° C. and 50% relative humidity for 5 days after which "Aged" FTIR-ATR spectra were obtained.

The size of the 910 cm⁻¹ absorbance was examined as an indicator of epoxy conversion, by comparing each spectrum (Exposed, 405 nm, Initial; Exposed, 405 nm, Aged; Exposed, 350BL, Initial; Exposed, 350BL, Aged) with the corresponding "Unexposed, Initial" spectra of the same composition. Samples were designated Uncured ("U") if the 910 cm⁻¹ peak was unchanged, Partial Cured ("P") if the peak was diminished but still visible, or Cured ("C") if no discernible peak remained.

For selected materials made using a continuous extrusion process (Comparatives E, H—O and Examples 10-27), spectroscopic data was obtained using an Nicolet iS50 FTIR spectrometer (Thermo Fisher Scientific Inc.) with a Smart iTR 3-bounce Diamond on ZnSe ATR accessory (PIKE Technologies, Madison, Wis.). Two regions of the spectroscopic output were analyzed to measure the percent-conversion of the multifunctional acrylate (1408 cm⁻¹), and the percent of the epoxy (910 cm⁻¹) which remained unreacted. Spectroscopic output was compared to output from uncured and fully cured samples to make quantitative measurements of percent conversion using TQ-Analyst software.

Compression Stress Relaxation

An initial force (F1) of 50 g was applied to the uncured tape by a stainless steel rod with a hemisphere tip, and the displacement of the tape was recorded for initial stiffness calculation. Then the force was measured with time while maintaining the same displacement (deformation) and the force after 60 sec was recorded as F2. The compression relaxation ratio is calculated using equation:

Compression stress relaxation ratio=(F1−F2)/F1

Tensile Pluck

The adhesion of plastic material to glass was determined by measuring the tensile strength of bonded specimens. Plastic test pieces, made of the specified material, measuring 22 mm×28 mm×4 mm, and tempered glass plaques, measuring 127 mm×50 mm×4 mm were wiped with a 1:1 (v:v) solution of isopropyl alcohol:water and were allowed to dry in air. Release liner was removed from a 22 mm×28 mm portion of the adhesive composition and this portion was applied to the plastic test piece. Lamination was accomplished by means of applying a 207 kPa (30 psi) to the test piece for 6 seconds. Unless otherwise specified, the second release liner was removed and the adhesive portion was exposed to a 365 nm LED (7.5 J/cm$^2$, CLEARSTONE TECHNOLOGIES, Hopkins, Minn.) light source, which was measured using a POWER PUCK II radiometer. The second substrate was applied and wet-out of the activated adhesive was accomplished by using 414 kPa (60 psi) for 6 seconds over the bonded area. The resulting bonded specimens then conditioned at ambient temperature and humidity for 24 hours prior to mechanical testing. Cured assemblies were mounted horizontally in an INSTRON Tensile Tester Model 5565 (INSTRON CORP., Canton, Mass.). A 70 mm arm is attached to the plastic test piece and is pulled upwardly (perpendicular to the plane of the bond) at a rate of 12.7 mm per minute. The load at break was recorded in N.

Parallel Torque

The Parallel Torque test measures how well hardware adheres to glass when subjected to a twisting force along the plane of the glass surface. A lever, such as a torque-wrench, with a fixture compatible with a test piece, is slowly turned in a plane parallel to the bonded area. Torque was recorded in N-m. Plastic test pieces, made of the specified material, measuring 22 mm×28 mm×4 mm, and frit-glass plaques, measuring 100 mm×100 mm×5 mm were wiped with a 1:1 (v:v) solution of isopropyl alcohol:water and were allowed to dry in air. A release liner was removed from a 22 mm×28 mm portion of the adhesive composition and this portion was applied to the plastic test piece.

Lamination was accomplished by means of applying a 207 kPa (30 psi) to the test piece for 6 seconds. Unless otherwise specified, the second release liner was removed and the adhesive portion was exposed to a 365 nm LED (7.5 J/cm$^2$, CLEARSTONE TECHNOLOGIES, Hopkins, Minn.) light source, which was measured using a POWER PUCK II radiometer. The second substrate was applied and wet-out of the activated adhesive was accomplished by using 414 kPa (60 psi) for 6 seconds over the bonded area. The resulting bonded specimens then conditioned at ambient temperature and humidity for 24 hours prior to mechanical testing.

Dolly Pull Off

The portable, hand-operated PosiTest Pull-Off Adhesion Tester (Defelsko, Ogdensburg, N.Y.) is used to measure the force required to pull a specified adhesive away from its substrate (a 20 mm aluminum Dolly) using smooth and continuous pull-off hydraulic pressure at a user-specified rate (207 kPa/sec). Pull off strength is recorded in MPa.

Materials

| | |
|---|---|
| ARCOL LHT 240 | Polyether polyol, obtained from Covestro |
| BA | Butyl acrylate, obtained from BASF SE |
| DYNACOLL S EP 1408 | Semi-crystalline polyester polyol, obtained from Evonik Industries |
| EPON 1001F | Epoxy resin comprised of diglycidyether of bisphenol A, obtained from Momentive Specialty Chemicals, Inc., Columbus, OH |
| EPON 828 | Epoxy resin comprised of diglycidyether of bisphenol A, obtained from Momentive Specialty Chemicals, Inc. |
| EPONEX 1510 | Epoxy resin comprised of diglycidyether of hydrogenated bisphenol A, obtained from Momentive Specialty Chemicals, Inc. |
| GPTMS | 3-(glycidoxypropyl) trimethoxysilane, obtained from United Chemical Technologies (Bristol, PA) |
| GMA | Glycidyl methacrylate, obtained from Dow Chemical Co. |
| HDDA | Hexanediol diacrylate, obtained from Allnex USA Inc., Alpharetta, GA |
| IRGACURE 651 | Benzyldimethyl ketal photoinitiator, obtained from BASF SE |
| IRGACURE 819 | Bis(2,4,6-trimethylbenzoyl)-phenylphosphineoxide photoinitiator, obtained from BASF SE |
| IOTG | Isooctyl Thioglycolate, obtained from Evans Chemetics LP, Teaneck, NJ |
| LEVAPREN 700HV | Ethylene-vinyl acetate copolymer, obtained from Lanxess Corp. |
| PETA | Pentaerytritol triacrylate, obtained from Sigma-Aldrich, St. Louis, MO, or Sartomer Americas, Exton, PA |
| PHENOXY PKHA | Phenoxy resin, obtained from InChem Corp. |
| SBT9263 | Thermally-cured structural bonding tape, obtained from 3M Company, St. Paul, MN |
| SBT9270 | Thermally-cured structural bonding tape, obtained from 3M Company |
| THFA | Tetrahydrofurfuryl acrylate (V-150), obtained from San Esters, New York, NY |
| UVI6976 | Triarylsulfonium hexafluoroantimonate, 50 wt % in propylene carbonate, obtained from Aceto |
| VORANOL 230-238 | Polyether polyol, obtained from Dow Chemical Co. |

Comparative A and Examples 1-2

Compositions COMPARATIVE A, EXAMPLE 1, and EXAMPLE 2 (shown in TABLE 1) were prepared using a BRABENDER mixer (C. W. BRABENDER, Hackensack, N.J.) equipped with a 50 g capacity heated mix head and kneading elements. The mixer was operated at the desired mixing temperature of 120° C. and the kneading elements were operated at 100 rpm. First the polymeric resin was added and allowed to mix for several minutes. The solid epoxy resin was added and allowed to mix until uniformly distributed through the mixture. A mixture of the liquid epoxy resin, polyol, acrylic resin, free-radical photoinitiator, and silane materials were added slowly until uniformly distributed. The addition port was covered with an aluminum pan and the resulting mixture was allowed to stir for several minutes then the photoacid generator was added drop-wise. The mixture was allowed to stir several minutes while being protected from light and was then transferred to an aluminum pan and allowed to cool. The mass of material was placed between two release liners and was pressed, with heating to 95° C., into 0.6 mm thick film by means of a hydraulic press (CARVER INC., Wabash, Ind.). Compositions were protected from light by wrapping and storing in foil.

The creep and creep-recovery behavior of each composition, in the uncured state (i.e., prior to cure of the epoxy components), was measured using a parallel plate rheometer according to the General Creep and Creep-Recovery Test.

The behavior of compositions prior to and after irradiation with either a 405 nm LED array or a 350BL source appear in TABLE 1.

The stability of compositions COMPARATIVE A, EXAMPLE 1, and EXAMPLE 2, in the uncured state, upon irradiation with either a 405 nm LED array or a 350BL source and subsequent aging at 38° C. and 50% relative humidity were measured using FTIR-ATR.

TABLE 1

Creep recovery and aging of compositions

|  | COMP. A | EX. 1 | EX. 2 |
|---|---|---|---|
| EPON 828 | 30 | 30 | 30 |
| EPON 1001F | 30 | 30 | 30 |
| ARCOL 240 LHT | 10 | 10 | 10 |
| GPTMS | 1 | 1 | 1 |
| LEVAPREN 700HV | 30 | 30 | 30 |
| UVI 6976 | 0.5 | 0.5 | 0.5 |
| IRGACURE 819 |  | 0.25 |  |
| IRGACURE 651 |  |  | 0.125 |
| PETA |  | 2 | 2 |
| CREEP (% strain) |  |  |  |
| Unexposed | 92 | 142 | 137 |
| Exposed, 405 nm |  | 72 | 77 |
| Exposed, 350BL | 69 | 56 | 34 |
| CREEP RECOVERY (%) |  |  |  |
| Unexposed | 40 | 30 | 34 |
| Exposed, 405 nm |  | 49 | 44 |
| Exposed, 350BL | 38 | 47 | 51 |
| FTIR-ATR |  |  |  |
| Unexposed, Initial | U | U | U |

TABLE 1-continued

Creep recovery and aging of compositions

|  | COMP. A | EX. 1 | EX. 2 |
|---|---|---|---|
| Exposed, 350BL, Initial | U | U | U |
| Exposed, 350BL, Aged | C | C | C |

Comparatives B-D and Examples 3-6

An acrylic copolymer consisting of BA, THFA, and GMA was prepared as generally taught in U.S. Pat. No. 5,804,610 (Hamer et al.). Solutions were prepared by combining 49 parts BA, 49 parts THFA, 2 parts GMA, 0.2 parts IRGACURE 651, and 0.1 parts IOTG in an amber glass jar and swirling by hand to mix. The solution was divided into 25 g aliquots within heat sealed compartments of an ethylene vinyl acetate-based film, immersed in a 16° C. water bath, and polymerized using UV light (UVA=4.7 mW cm$^{-2}$, 8 minutes per side). This acrylic copolymer was further processed to yield compositions COMPARATIVES B-D and EXAMPLES 3-6 (shown in TABLE 2).

These compositions were prepared using a BRABENDER mixer using the same procedure as described above for COMPARATIVE A and EXAMPLES 1-2.

The creep and creep-recovery behavior of each composition, in the uncured state (i.e., prior to cure of the epoxy components), was measured using a parallel plate rheometer according to the General Creep and Creep-Recovery Test. The behavior of compositions prior to and after irradiation with a 405 nm LED array appear in TABLE 2. Samples with creep>1000% strain were difficult to remove from release liner and exhibited very low creep-recovery.

TABLE 2

Creep recovery of compositions

|  | COMP. B | COMP. C | EX. 3 | EX. 4 | COMP. D | EX. 5 | EX. 6 |
|---|---|---|---|---|---|---|---|
| ACRYLIC COPOLYMER[a] | 32 | 33 | 33 | 31 | 38 | 37 | 37 |
| EPONEX 1510 | 19 | 20 | 20 | 19 | 24 | 23 | 23 |
| EPON 1001F | 19 | 20 | 20 | 19 | 24 | 23 | 23 |
| ARCOL 240 LHT | 10 | 10 | 10 | 9 | 12 | 12 | 12 |
| GPTMS | 1 | 1 | 1 | 1 | 1 | 1 | 1 |
| LEVAPREN 700HV | 10 | 10 | 10 | 9 |  |  |  |
| PHENOXY PKHA | 10 | 10 | 10 | 9 |  |  |  |
| UVI 6976 | 0.5 | 0.5 | 0.5 | 0.5 | 0.5 | 0.5 | 0.5 |
| IRGACURE 819 |  | 0.25 | 0.25 | 0.25 |  | 0.25 | 0.25 |
| PETA |  |  | 2 |  |  | 2.8 | 1.3 |
| HDDA |  |  |  | 2 |  |  | 1.3 |
| CREEP (% strain) |  |  |  |  |  |  |  |
| Unexposed | 167 | 208 | 179 | 263 | >1000 | >1000 | >1000 |
| Exposed, 405 nm |  | 207 | 52 | 131 |  | 83 | 197 |
| CREEP RECOVERY (%) |  |  |  |  |  |  |  |
| Unexposed | 31 | 25 | 34 | 23 | <5 | <5 | <5 |
| Exposed, 405 nm |  | 24 | 70 | 40 |  | 80 | 75 |

[a]49:49:2 BA:THFA:GMA copolymer

TABLE 1-continued

Creep recovery and aging of compositions

|  | COMP. A | EX. 1 | EX. 2 |
|---|---|---|---|
| Unexposed, Aged | U | U | U |
| Exposed, 405 nm, Initial | U | U | U |
| Exposed, 405 nm, Aged | U | U | U |

Comparatives E-F and Example 7

Compositions COMPARATIVES E-F and EXAMPLE 7 (shown in TABLE 3 along with EXAMPLE 1 for comparison) were prepared using a BRABENDER mixer using the same procedure as described above for COMPARATIVE A and EXAMPLES 1-2.

The creep and creep-recovery behavior of each composition, in the uncured state (i.e., prior to cure of the epoxy components), was measured using a parallel plate rheometer according to the General Creep and Creep-Recovery Test. The behavior of compositions prior to and after irradiation with a 405 nm LED array appear in TABLE 3. Samples with creep>1000% strain were difficult to remove from release liner and exhibited very low creep-recovery.

TABLE 3

Creep Recovery of Compositions

|  | COMP. A | COMP. E | EX. 1 | COMP. F | EX. 7 |
|---|---|---|---|---|---|
| EPON 828 | 30 | 30 | 30 | 15 | 15 |
| EPON 1001F | 30 | 30 | 30 | 29 | 29 |
| ARCOL 240 LHT | 10 | 10 | 10 | 15 | 15 |
| GPTMS | 1 | 1 | 1 |  |  |
| LEVAPREN 700HV | 30 | 10 | 10 |  |  |
| DYNACOLL S EP 1408 |  |  |  | 40 | 40 |
| UVI 6976 | 0.5 | 0.5 | 0.5 | 1 | 1 |
| IRGACURE 819 |  | 0.25 | 0.25 |  | 0.25 |
| PETA |  |  | 2 |  | 2 |
| HDDA |  |  |  |  |  |
| CREEP (% strain) |  |  |  |  |  |
| Unexposed | 92 | 118 | 142 | >1000 | >1000 |
| Exposed, 405 nm |  | 122 | 72 |  | 21 |
| CREEP RECOVERY (%) |  |  |  |  |  |
| Unexposed | 40 | 37 | 30 | <1 | <5 |
| Exposed, 405 nm |  | 38 | 49 |  | 68 |

Comparative G and Examples 8-17

Preparatory compositions 1-3 were prepared by compounding on a 30 mm APV co-rotating twin-screw extruder. Raw materials for these preparatory compositions (listed in TABLE 4) were fed into the extruder, mixed and then extruded through a 6 inch (15 cm) film die onto a differential release liner. Care was taken to minimize ambient light exposure of the finished rolls of adhesive.

TABLE 4

Particulars of three adhesive formulations.

|  | Preparatory Composition 1 | Preparatory Composition 2 | Preparatory Composition 3 |
|---|---|---|---|
| LEVAPREN 700HV | 9.1 | 8.8 | 8.8 |
| Phenoxy PKHA | 9.1 | 8.8 | 8.8 |
| EPON 1001F | 19.1 | 18.5 | 18.6 |
| ACRYLIC COPOLYMER (see EX. 3) | 33.2 | 32.2 | 32.4 |
| EPONEX 1510 | 19.1 | 18.5 | 18.6 |
| VORANOL 230-238 | 9.1 | 8.8 | 8.8 |
| GPTMS | 0.9 | 0.9 | 0.9 |
| UVI 6976 | 0.5 | 0.5 | 0.5 |
| IRGACURE 819 | 0.0 | 0.25 | 0.2 |
| PETA | 0.0 | 3.0 | 2.4 |

The three preparatory compositions were irradiated closed-face between a pair of liners using the 405 nm Exposure at different doses (J/cm²) to provide Comparatives D-F and Examples 13-20. The doses used are listed below in TABLE 5.

TABLE 5

405 nm light exposure given to the three adhesive formulations

| Preparatory Composition | 405 nm Exposure (J/cm$^2$) |
|---|---|
| COMP. G | 1 | 0 |
| EX. 8 | 2 | 0 |
| EX. 9 | 2 | 0.4 |
| EX. 10 | 2 | 0.8 |
| EX. 11 | 2 | 1.6 |
| EX. 12 | 2 | 3.2 |
| EX. 13 | 3 | 0 |
| EX. 14 | 3 | 0.4 |
| EX. 15 | 3 | 0.8 |
| EX. 16 | 3 | 1.6 |
| EX. 17 | 3 | 3.2 |

Creep and Creep-Recovery Test 1 data for these samples are listed in TABLE 6. In this test, a torsional stress of 5000 Pa was applied to the adhesive over the first 300 s, after which the stress is removed, and the adhesive allowed to recover for 600 s. The remaining strain in the material after recovery was reported at end of the 900 s test. Values of strain (%) were determined after each stage of the test (i.e., under load & recovery).

TABLE 6

Creep measurements after 405 nm Exposure

|  | % Strain at 300 s | % Strain at 900 s |
|---|---|---|
| COMP. G | 1870 | 1680 |
| EX. 8 | 850 | 682 |
| EX. 9 | 91.8 | 29.3 |
| EX. 10 | 80.6 | 20.6 |
| EX. 11 | 81.1 | 21.2 |
| EX. 12 | 77.4 | 22.4 |
| EX. 13 | 936 | 695 |
| EX. 14 | 178 | 55.7 |
| EX. 15 | 100 | 30.4 |
| EX. 16 | 78.5 | 20.8 |
| EX. 17 | 81.2 | 25.6 |

Spectroscopic data for each sample are presented in TABLE 7. This data illustrates that it is possible to independently photochemically trigger the free-radical polymerization of the acrylic rheology modifier without initiating the polymerization of the epoxy. The degree to which species were reacted was calculated by integrating the epoxy absorbance on each sample's IR absorbance spectrum. With the inherent variation of the measurement and sample preparation, some of the values reported in the table are greater than unity (i.e., reported as values greater than 100%).

The percent acrylic cure was determined by measuring the absorbance at 1408 cm-1. The percentage of unreacted epoxy was measured at 910 cm-1. These data show the dependency of acrylic cure on exposure dose (higher percent conversion with increased 405 nm exposure). High conversion (exceeding 90%) was achieved quickly, yet the polymerization of the epoxy remained uninitiated.

TABLE 7

ATR spectroscopic data on adhesive samples after indicated 405 nm exposure

|  | % Acrylic Cure | % Unreacted Epoxy |
|---|---|---|
| EX. 8 | 0 | 100 |
| EX. 9 | 85.4 | 101.1 |

TABLE 7-continued

ATR spectroscopic data on adhesive samples after indicated 405 nm exposure

|  | % Acrylic Cure | % Unreacted Epoxy |
|---|---|---|
| EX. 10 | 87.9 | 101.1 |
| EX. 11 | 95 | 100.7 |
| EX. 12 | 100 | 99.5 |
| EX. 13 | 0 | 100 |
| EX. 14 | 86.7 | 99.6 |
| EX. 15 | 91.3 | 100.3 |
| EX. 16 | 95.3 | 100.4 |
| EX. 17 | 98.3 | 99.2 |

Comparatives H-J and Example 18

Compositions for COMPARATIVE H and EXAMPLE 18 are provided below in TABLE 8.

TABLE 8

Compositions with and without a free radical polymerizable resin

|  | COMP. H | EX. 18 |
|---|---|---|
| ACRYLIC COPOLYMER | 33.2 | 32.4 |
| EPONEX 1510 | 19.1 | 18.6 |
| EPON 1001F | 19.1 | 18.6 |
| ARCOL 240LHT | 9.1 | 8.8 |
| GPTMS | 0.9 | 0.9 |
| LEVAPREN 700HV | 9.1 | 8.8 |
| PHENOXY PKHA | 9.1 | 8.8 |
| UVI 6976 | 0.5 | 0.5 |
| IRGACURE 819 |  | 0.2 |
| PETA |  | 2.4 |
| Exposed at 405 nm? | No | Yes |

COMPARATIVE H was mixed using a twin screw extruder and coated onto a release liner then wound up into a tape roll for further study.

EXAMPLE 18 was mixed using a twin screw extruder and coated onto a release liner, then subjected to the 405 nm Exposure under an inert atmosphere ($N_2$) for 5-15 s using a dosage of 1.8 J/cm² UVA as measured by a POWER PUCK II radiometer. After exposure, it is wound into a tape roll for further study.

COMPARATIVES I and J are commercially-available structural bonding tapes, SBT9263 and SBT9270, respectively. Unlike the provided structural bonding adhesives, both SBT9263 and SBT9270 are cured thermally.

Compression stress values can reflect how well a tape wets out a given substrate. The lower the compression stress relaxation value, the more elastic the tape is, and generally the lower the wet-out. TABLE 9A shows the compression stress relaxation value of four different uncured tapes.

Both COMPARATIVE H and EXAMPLE 18 showed higher compression stress relaxation values than COMPARATIVES I and J, suggesting the tape can quickly dissipate the energy and recover from the stress after 60 sec to reduce the opportunities of de-wetting from substrate.

TABLE 9A

Compression stress relaxation test results

|  | Compression stress relaxation at 60 s |
|---|---|
| COMP. H | 0.92 |
| EX. 18 | 0.79 |

TABLE 9A-continued

Compression stress relaxation test results

|  | Compression stress relaxation at 60 s |
|---|---|
| COMP. I | 0.62 |
| COMP. J | 0.58 |

Creep and Creep-Recovery Test 2 measurements simulate the response of the B stage adhesive to comparatively gentler stresses (relative to the measurements shown in TABLE 6) that might be encountered in common handling and storage conditions. The Creep and Creep-Recovery 2 test data for these samples are listed in TABLE 9B. Here, a torsional stress of 10 Pa was applied to the adhesive over the first 600 s, after which the stress is removed, and the adhesive allowed to recover for 120 s. The remaining strain in the material after recovery was determined at end of the 720 s test. Values of strain (%) were determined after each stage of the test (i.e., under load & recovery).

TABLE 9B

Creep measurements after 405 nm Exposure

|  | % Strain at 600 s | % Strain at 720 s |
|---|---|---|
| COMP. H | 2.0 | 1.6 |
| EX. 18 | 0.24 | 0.063 |

Comparatives K-M and Examples 19-22

The Parallel torque and pluck properties of the adhesive composition of COMPARATIVE H were evaluated following 365 nm Curing Exposure at three different UVA dosages (7.5 J/cm², 9 J/cm², 12 J/cm²) to obtain COMPARATIVES K-M. The results are listed in TABLE 10.

TABLE 10

Mechanical performance evaluation under different UVA incident energy levels

|  | UVA Energy (J/cm²) | Parallel-torque (N-m) | Pluck (N) |
|---|---|---|---|
| COMP. K | 7.5 | 13.4 | 869 |
| COMP. L | 9.0 | 14.2 | 829 |
| COMP. M | 12 | 14.9 | 846 |

Parallel torque and pluck properties of the adhesive composition of EXAMPLE 18 were evaluated following 365 nm Curing Exposure at the three UVA dosages above (7.5 J/cm², 9 J/cm², 12 J/cm²) to obtain EXAMPLES 19-21. Results are listed in TABLE 11.

TABLE 11

Mechanical performance under different UVA dosages

|  | UVA Energy (J/cm²) | Parallel-torque (N-m) | Pluck (N) |
|---|---|---|---|
| EX. 19 | 7.5 | 11.6 | 512 |
| EX. 20 | 9.0 | 10.1 | 521 |
| EX. 21 | 12 | 7.4 | 477 |

Comparatives N-O and Examples 22-23

Plastic test pieces, made of the specified material, measuring 22 mm×28 mm×4 mm, and frit-glass plaques, measuring 100 mm×100 mm×5 mm were wiped with a 1:1 (v:v) solution of isopropyl alcohol:water and were allowed to dry in air. A release liner was removed from a 22 mm×28 mm portion of the adhesive composition and this portion was applied to the plastic test piece.

Lamination was accomplished by means of applying a 207 kPa (30 psi) to the test piece for 6 seconds. Unless otherwise specified, the second release liner was removed and the adhesive portion was subjected to the 365 nm Curing Exposure at a dosage of 7.5 J/cm$^2$. The second substrate was applied after the specified open time listed in TABLE 12, and wet-out of the activated adhesive was accomplished by using 414 kPa (60 psi) for 6 seconds over the bonded area. The resulting bonded specimens then conditioned at ambient temperature and humidity for 24 hours prior to mechanical testing.

COMPARATIVES N-O and EXAMPLES 22-23 were prepared to determine the parallel torque performance of adhesives using the compositions of COMPARATIVE H and EX. 18, each of which were evaluated with two different times to bond closing. Here, the "time to bond closing" is defined by the period of time between when the operator activates the tape with the UVA light source and when the hardware is placed onto the substrate. Results are listed in TABLE 12.

TABLE 12

Parallel torque performance with different times to bond closing

|  | Composition based on: | Time to bond closing | Parallel-torque (N-m) |
|---|---|---|---|
| COMP. N | COMP. H | 0 min | 13.4 |
| COMP. O | COMP. H | 5 min | 14.2 |
| EX. 22 | EX. 18 | 0 min | 11.6 |
| EX. 23 | EX. 18 | 5 min | 11.9 |

Comparatives P-Q and Examples 24-25

A dolly test piece, made of Aluminum and having a diameter of 20 mm (Defelsko, Ogdensburg, N.Y.) and fit-glass plaques, measuring 100 mm×100 mm×5 mm were wiped with a 1:1 (v:v) solution of isopropyl alcohol:water and were allowed to dry in air. A release liner was removed from a 20 mm diameter adhesive composition and this portion was applied to the aluminum dolly test piece.

Lamination was accomplished by means of applying a 207 kPa (30 psi) to the test piece for 6 seconds. Unless otherwise specified, the second release liner was removed and the adhesive portion was subjected to the 365 nm Curing Exposure. The second substrate was then applied immediately to close the bond. The wet-out of the activated adhesive was accomplished by applying 414 kPa (60 psi) for 6 seconds over the bonded area. The resulting bonded specimens then conditioned at ambient temperature and humidity and tested using the Dolly Pull Off test at times specified in TABLE 13.

TABLE 13

Dolly pull-off strength over time

|  | Composition based on: | Curing Time | Pull-off Strength (MPa) |
|---|---|---|---|
| COMP. P | COMP. H | 2 hr | 1.6 |
| COMP. Q | COMP. H | 24 hr | 4.9 |
| EX. 24 | EX. 18 | 2 hr | 5.4 |
| EX. 25 | EX. 18 | 24 hr | 7.9 |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

The invention claimed is:

1. A method of making a structural bonding adhesive comprising:
   mixing a first curable resin and a second curable resin to provide an uncured adhesive; and
   irradiating the uncured adhesive using a first actinic light source to polymerize the first curable resin selectively without polymerizing the second curable resin thereby providing a partially cured adhesive with reduced cold flow creep under ambient conditions, wherein the partially cured adhesive is a pressure-sensitive adhesive and is capable of being fully cured by irradiating the partially cured adhesive using a second actinic light source different from the first actinic light source to polymerize the second curable resin.

2. The method of making a structural bonding adhesive according to claim 1, wherein the first curable resin comprises:
   a monomer containing one or more ethylenically unsaturated functional groups; and
   a first photoinitiator capable of initiating polymerization of the ethylenically unsaturated functional group.

3. The method of making a structural bonding adhesive according to claim 1, wherein the second curable resin comprises:
   a monomer containing a cationically-active functional group; and
   a second photoinitiator capable of initiating polymerization of the cationically-active functional group.

4. The method of making a structural bonding adhesive according to claim 1, wherein the curable composition comprises:
   a) a cationically curable resin;
   b) optionally, a polyol;
   c) a polyfunctional (meth)acrylate;
   d) optionally, a polymeric resin at least partially miscible with a)-c);
   e) a free radical photoinitiator sensitive to radiation from the first actinic light source; and
   f) a photoacid generator sensitive to radiation from the second actinic light source.

5. The method of making a structural bonding adhesive according to claim 4, wherein the curable composition comprises:
   a) in the range of 10-80 parts of one or more epoxy resins;
   b) in the range of 0-20 parts of one or more polyols;

c) in the range of 0-5 parts of one or more polyfunctional (meth)acrylates;
d) in the range of 0-50 parts of one or more polymeric resins at least partially miscible with a)-c), wherein the sum of a)-d) is 100 parts per weight;
e) in the range of 0.02-5 parts of a free radical photoinitiator; and
f) in the range of 0.05-5 parts of a photoacid generator.

6. A structural bonding adhesive made by the method of claim 1.

7. The method of claim 1, wherein the partially cured adhesive displays a cold flow creep recovery of at least 40 percent.

8. The method of claim 1, wherein the partially cured adhesive has a shelf life of at least 5 days, measured from the formation of the partially cured adhesive.

9. The method of claim 1, wherein the first actinic light source produces a peak intensity at a wavelength of from 380 nm to 420 nm and an excitation dose of from 200 mJ/cm$^2$ through 6400 mJ/cm$^2$.

10. The method of claim 1, wherein the second actinic light source produces a peak intensity at a wavelength of from 200 nm to 380 nm.

11. The method of claim 1, wherein the first and second actinic light sources have respective peak intensities at respective wavelengths separated by from 10 nm to 100 nm.

12. A method of bonding hardware to a substrate comprising:
disposing the partially cured adhesive made by the method of claim 1 on a bonding surface of either the hardware or the substrate;
either before or after disposing the partially cured adhesive on the bonding surface, irradiating the partially cured adhesive using the second actinic light source to initiate polymerization of the second curable resin;
placing the hardware so as to be bonded to the substrate by the partially cured adhesive; and
allowing the partially cured adhesive to fully cure as the second curable resin polymerizes.

13. A method of bonding hardware to a substrate comprising:
disposing a partially cured adhesive on a bonding surface of either the hardware or the substrate, the partially cured adhesive comprising the reaction product of a curable composition irradiated by a first actinic light source, the curable composition comprised of:
a) a free radical-polymerizable resin;
b) a cationically-polymerizable resin;
c) a free radical photoinitiator sensitive to radiation from the first actinic light source; and
d) a photoacid generator sensitive to radiation from a second actinic light source different from the first actinic light source;
either before or after disposing the partially cured adhesive on the bonding surface, irradiating the partially cured adhesive using the second actinic light source;
placing the hardware so as to be bonded to the substrate by the partially cured adhesive; and
allowing the partially cured adhesive to fully cure.

14. The method of bonding hardware to a substrate according to claim 13, wherein the free radical-polymerizable resin includes a monomer containing a hydroxyl group or epoxy group.

15. The method of bonding hardware to a substrate according to claim 13, wherein the partially cured adhesive is a pressure-sensitive adhesive.

16. A curable composition for making a structural bonding adhesive, the curable composition comprising:
a free radical-polymerizable resin;
a cationically-polymerizable resin;
a free radical photoinitiator sensitive to radiation from the first actinic light source; and
a photoacid generator insensitive to radiation from the first actinic light source but sensitive to radiation from a second actinic light source, wherein the free radical-polymerizable resin and the cationically-polymerizable resin are capable of covalently bonding with each other when irradiated by the second actinic light source.

17. The curable composition of claim 16, wherein the curable composition contains 10-50 parts of the one or more polymeric resins.

18. A curable composition for making a structural bonding adhesive, the curable composition comprising:
a) in the range of 0.1-70 parts of one or more free radical-polymerizable resins;
b) in the range of 10-80 parts one or more cationically-polymerizable resins;
c) in the range of 0-20 parts of one or more polyols;
d) in the range of 0-50 parts of one or more polymeric resins at least partially miscible with a)-c), wherein the sum of a)-d) is 100 parts per weight;
e) in the range of 0.02-5 parts of a free radical photoinitiator; and
f) in the range of 0.05-5 parts of a photoacid generator.

19. The curable composition of claim 18, wherein the free radical-polymerizable resin contains a hydroxyl group and/or a glycidyl group.

20. An adhesive-backed article comprising:
hardware having a bonding surface; and
the structural bonding adhesive made according to the method of claim 1 disposed on the bonding surface.

* * * * *